United States Patent
Sarangi et al.

(10) Patent No.: US 9,982,175 B2
(45) Date of Patent: May 29, 2018

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Nilanjan Sarangi, Shrewsbury, MA (US); Yang Zhong, Hopkinton, MA (US); Sandhya Jayaraman Rukmani, Westborough, MA (US); Ralph Bauer, Niagara Falls (CA); Stefan Vujcic, Buffalo, NY (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 0 days. days.

(21) Appl. No.: 14/984,291

(22) Filed: Dec. 30, 2015

(65) Prior Publication Data

US 2016/0186027 A1   Jun. 30, 2016

Related U.S. Application Data

(60) Provisional application No. 62/097,848, filed on Dec. 30, 2014.

(51) Int. Cl.
*B24D 3/04*   (2006.01)
*B24D 3/14*   (2006.01)
*C09K 3/14*   (2006.01)
*B24D 3/28*   (2006.01)
*B24D 3/34*   (2006.01)

(52) U.S. Cl.
CPC ............. *C09K 3/1409* (2013.01); *B24D 3/28* (2013.01); *B24D 3/34* (2013.01); *C09K 3/1436* (2013.01)

(58) Field of Classification Search
CPC ... B24D 3/04; B24D 3/14; B24D 3/34; C09K 3/1436; C09K 3/1409
See application file for complete search history.

(56) References Cited

U.S. PATENT DOCUMENTS 4,881,951 A    11/1989   Wood et al.
4,898,594 A    2/1990    Cottenden
(Continued)

FOREIGN PATENT DOCUMENTS

CN    1649802 A      8/2005
CN    101247911 A    8/2008
(Continued)

OTHER PUBLICATIONS

International Search Report issued in PCT/US2015/068154 dated Apr. 1, 2016, 1 page.
(Continued)

*Primary Examiner* — Pegah Parvini
(74) *Attorney, Agent, or Firm* — Able Law Group, LLP; Thomas H. Osborn

(57) ABSTRACT

An abrasive article can include a body including a bond material and abrasive particles contained within the bond material. The abrasive particles can include nanocrystalline alumina. The bond material can include an inorganic material including a ceramic.

19 Claims, 5 Drawing Sheets

(56) References Cited

U.S. PATENT DOCUMENTS

| | | | |
|---|---|---|---|
| 5,178,644 A * | 1/1993 | Huzinec | B24D 3/18 51/293 |
| 5,203,886 A | 4/1993 | Sheldon et al. | |
| 5,401,284 A | 3/1995 | Sheldon et al. | |
| 5,516,348 A * | 5/1996 | Conwell | C09K 3/1436 501/153 |
| 5,527,369 A | 6/1996 | Garg | |
| 5,863,308 A | 1/1999 | Qi et al. | |
| 6,702,867 B2 | 3/2004 | Carman et al. | |
| 6,802,878 B1 | 10/2004 | Monroe | |
| 8,043,393 B2 | 10/2011 | Querel et al. | |
| 2001/0027623 A1 * | 10/2001 | Rosenflanz | B24D 3/06 51/309 |
| 2003/0115805 A1 | 6/2003 | Rosenflanz et al. | |
| 2003/0145525 A1 | 8/2003 | Rosenflanz | |
| 2005/0132658 A1 | 6/2005 | Celikkaya et al. | |
| 2007/0074456 A1 | 4/2007 | Orlhac et al. | |
| 2007/0249482 A1 | 10/2007 | Rosenflanz | |
| 2008/0148653 A1 | 6/2008 | Bauer et al. | |
| 2008/0293345 A1 * | 11/2008 | Bright | B24B 5/363 451/540 |
| 2009/0098365 A1 * | 4/2009 | Moeltgen | B82Y 30/00 428/328 |
| 2011/0083374 A1 | 4/2011 | Querel et al. | |
| 2012/0167481 A1 | 7/2012 | Yener et al. | |
| 2012/0247027 A1 | 10/2012 | Sarangi et al. | |
| 2016/0186026 A1 | 6/2016 | Zhong et al. | |

FOREIGN PATENT DOCUMENTS

| | | |
|---|---|---|
| EP | 1904252 B1 | 5/2011 |
| TW | 200718511 A | 5/2007 |
| TW | 201402279 A | 1/2014 |

OTHER PUBLICATIONS

Apr. 1, 2016 International Search Report issued in Application No. PCT/US2015/068167, 1 page.

* cited by examiner

ABRASIVE ARTICLES AND METHODS FOR FORMING SAME

CROSS-REFERENCE TO RELATED APPLICATION(S)

This application claims priority under 35 U.S.C. § 119(e) to U.S. Patent Application No. 62/097,848 entitled "ABRASIVE ARTICLES AND METHODS FOR FORMING SAME," by Nilanjan SARANGI et al., filed Dec. 30, 2014, which is assigned to the current assignee hereof and incorporated herein by reference in its entirety.

BACKGROUND OF THE INVENTION

Field of the Disclosure

The present invention relates in general to abrasive articles and, in particular, to bonded abrasive articles including nanocrystalline alumina.

Description of the Related Art

Bonded abrasive articles can include abrasive particles contained in a bond material matrix. Some types of abrasive particles, such as microcrystalline alumina, can be susceptible to chemical reactions at high temperatures. Vitreous bond materials have a tendency to penetrate and react with microcrystalline alumina grits during high temperature formation of the abrasive articles, which can lead to reduced hardness of the abrasives and even corrosion of the abrasives.

The industry continues to demand improved abrasive articles.

BRIEF DESCRIPTION OF THE DRAWINGS

Embodiments are illustrated by way of example and are not limited in the accompanying figures.

Figure 1:
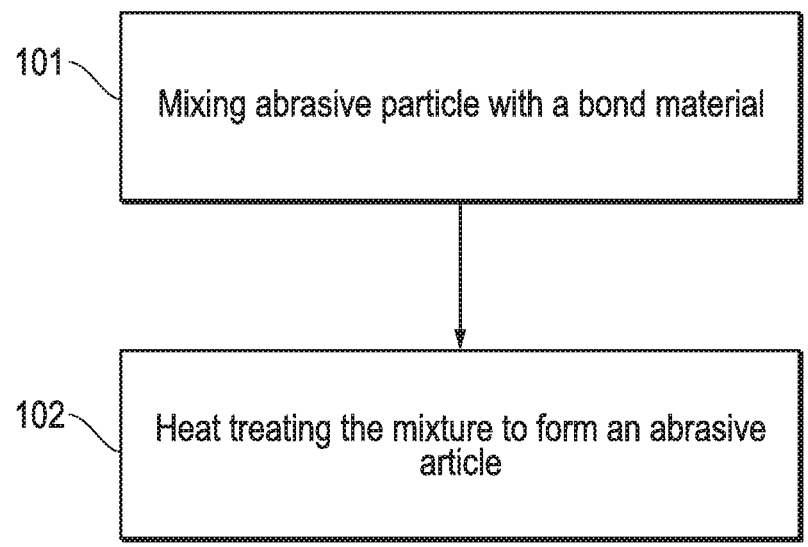
FIG. 1 includes a flow chart for forming an abrasive article.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments are related to a method of forming an abrasive article including forming a mixture including the bond material and abrasive articles, and forming the mixture into the abrasive article by heating the mixture to a forming temperature. The method may facilitate formation of the abrasive articles with enhanced performance.

FIG. 1 includes a flow chart of a method of forming an abrasive article according to an embodiment. At step 101, a mixture can be made including a bond material (or precursor of the bond material) and abrasive particles comprising nanocrystalline alumina. The mixture can be wet or dry. The bond material can be in the form of a powder material that can be mixed with the abrasive particles. In certain instances, suitable mixing operations can be utilized to achieve homogenous dispersion of the components within the mixture.

The mixture may also include one or more optional additives, including for example, secondary abrasive particles, fillers, and the like. According to a non-limiting embodiment, the secondary abrasive particles can include alumina oxide, silicon carbide, cubic boron nitride, diamond, flint and garnet grains, and any combination thereof. In another non-limiting embodiment, some suitable fillers can include organic and inorganic materials. The filler material can be distinct from the abrasive particles. For example, the fillers can be pore formers including, such as hollow glass beads, ground walnut shells, beads of plastic material or organic compounds, foamed glass particles and bubble alumina, elongated grains, fibers and combinations thereof. Other filler materials can include pigments and/or dyes, fibers, woven materials, non-woven materials, particles, spheres, minerals, nuts, shells, oxides, alumina, carbide, nitrides, borides, organic materials, polymeric materials, naturally occurring materials, powders, and a combination thereof. In an embodiment, the filler can be selected from the group consisting of powders, granules, spheres, fibers, pore formers, hollow particles, and a combination thereof. In a particular embodiment, the filler can consist essentially of any one of the materials described herein. In another particular embodiment, the filler can consist essentially of two or more of the materials described in embodiments herein.

After forming the mixture at step 101, the process can continue at step 102, which can include heat treating the mixture to form an abrasive article in the form of a bonded abrasive body having abrasive particles comprising nanocrystalline alumina contained in a three-dimensional network of bond material.

According to an embodiment, the mixture can be heat treated to a forming temperature. The forming temperature can be at least 900° C., such as at least 950° C., or at least 975° C. According to another embodiment, the forming temperature may not be greater than 1200° C., such as not greater than 1175° C., not greater than 1150° C., not greater than 1125° C., or not greater than 1100° C. The forming temperature of embodiments herein can provide sufficient heat for the abrasive particles to bond with the bond material, but help to reduce reactivity of certain materials contained in the bond material.

According to another embodiment, the bond material can include an inorganic material, such as a ceramic. A ceramic material is a composition that includes at least one metal or metalloid element, including but not limited to alkali metal element, alkaline earth metal elements, lanthanoids, transition metal elements, and a combination thereof. A ceramic material may include oxides, carbides, nitrides, borides, and a combination thereof. Moreover, a ceramic material can include a single crystalline phase, a polycrystalline phase, an amorphous phase, and a combination thereof. It will be appreciated that a ceramic material can consist essentially of a single crystalline phase, a polycrystalline phase or amorphous phase.

According to another embodiment, the bond material can include a vitreous material. The vitreous material can have an amorphous phase. For instance, the bond material can consist essentially of a vitreous material having an amorphous phase. According to yet another embodiment, the bond material can include a non-vitreous material. The non-vitreous material can include a polycrystalline phase. In still another embodiment, the bond material can include a mixture of polycryalline and vitreous material.

According to at least one embodiment, the bond material can include boron oxide ($B_2O_3$) in a certain content that may facilitate improved forming and/or performance of the abrasive article. Boron oxide can be present in a certain weight percentage compared to the total weight of the bond material. For example, boron oxide may be not greater than 30 wt %, such as not greater than 28 wt %, not greater than 26 wt %, not greater than 24 wt %, or even not greater than 22 wt %. For another instance, the bond material can include at least 5 wt % of boron oxide, such as at least 8 wt %, at least 10 wt %, at least 12 wt %, or even at least 15 wt %. It will be understood that the weight percentage of boron oxide in the bond material can be within a range of any minimum to maximum percentages noted above. For example, the bond material can include boron oxide within a range of 5 wt % to 30 wt % or within a range of 8 wt % to 22 wt %.

In another embodiment, the bond material can include silicon oxide ($SiO_2$) in a certain content that may facilitate improved forming and/or performance of the abrasive article. The content of silicon oxide relative to the total weight of the bond material may be, for example, not greater than 80 wt %, not greater than 75 wt %, not greater than 70 wt %, not greater than 65 wt %, not greater than 55 wt %, not greater than 52 wt %, or even not greater than 50 wt %. In another embodiment, the bond material can include at least 25 wt % silicon oxide, such as at least 30 wt %, at least 35 wt %, at least 38 wt %, or even at least 40 wt %. It will be appreciated that the content of silicon oxide can be within a range of any minimum to maximum percentages noted above. For example, the silicon oxide content can be within a range of 35 wt % to 80 wt %, or within a range of 40 wt % to 65 wt %. In a particular embodiment, the silicon oxide content can be within a range of 40 wt % to 50 wt %.

In a particular embodiment, the bond material can include boron oxide and silicon oxide in a certain content that may facilitate improved forming and/or performance of the abrasive article. The total content of boron oxide and silicon oxide may be not greater than 80 wt %, such as not greater than 77 wt %, not greater than 75 wt %, not greater than 73 wt %, not greater than 70 wt %, or even not greater than 65 wt %. In another embodiment, the total content of boron oxide and silicon oxide can be at least 40 wt %, at least 42 wt %, at least 46 wt %, at least 48 wt %, or even at least 50 wt %. It will be appreciated that the total content of boron oxide and silicon oxide can be within a range of any of the minimum and maximum percentages disclosed herein. For example, the total content of boron oxide and silicon oxide can be within a range of 40 wt % to 80 wt % or within a range of 42 wt % to 77 wt % or within a range of 46 wt % to 73 wt % or within a range of 50 wt % to 65 wt %.

In certain instances, the bond material may have a particular ratio of boron oxide and silicon oxide that may facilitate improved forming and/or performance of the abrasive article. The bond material can include a weight percent ratio between silicon oxide and boron oxide may be not greater than 5.5:1 ($SiO_2:B_2O_3$), such as not greater than 5.2:1, not greater than 5:1, or even not greater than 4.8:1. In other instances, the weight percentage ratio between silicon oxide and boron oxide can be at least 1:1, at least 1.3:1, at least 1.5:1, at least 1.7:1, at least 2.0:1, or even at least 2.2:1. It will be appreciated that the weight percentage ratio between silicon oxide and boron oxide can be within a range of any of the minimum and maximum ratios noted above, for example, the ratio can be within a range of 1:1 to 5.5:1 or within a range of 1.5:1 to 5.2:1 or within a range of 1.8:1 to 5/0:1 or within a range of 2.2:1 to 4.8:1.

According to an embodiment, the bond material can include aluminum oxide ($Al_2O_3$) in a content that can facilitate improved forming and/or performance of the abrasive article. The content of aluminum oxide relative to the total weight of the bond material may be not greater than 31 wt %, such as not greater than 28 wt %, not greater than 25 wt %, not greater than 23 wt %, or even not greater than 20 wt %. In another embodiment, the content of aluminum oxide in the bond material can be at least 5 wt %, at least 8 wt %, at least 10 wt %, at least 12 wt %, or even at least 14 wt %. It will be appreciated that the content of aluminum oxide can be within a range of any of the minimum and maximum percentages noted above, for instance, within a range of 5 wt % to 31 wt % or within a range of 10 wt % to 25 wt %.

According to at least one embodiment, the bond material may include a content of aluminum and alumina that can facilitate improved forming and/or improved performance of the abrasive article. For example, the bond material can include at least 15 wt % alumina and aluminum metal ($Al_2O_3/Al$) for a total weight of the bond material. In still other instances, the bond material can include at least 18 wt %, such as at least 20 wt %, at least 22 wt %, or even at least 24 wt % alumina and aluminum metal ($Al_2O_3/Al$) for a total weight of the bond material. In another non-limiting embodiment, the bond material can include not greater than 45 wt %, such as not greater than 42 wt %, not greater than 40 wt %, not greater than 38 wt %, not greater than 35 wt %, or even not greater than 32 wt % alumina and aluminum metal for a total weight of the bond material. It will be appreciated that the bond material can include a content of alumina and aluminum metal within a range including any of the minimum and maximum percentages noted above. For instance, the content of alumina and aluminum metal can be within a range of 5 wt % to 45 wt % or within a range of 10 wt % to 40 wt % or within a range of 22 wt % to 35 wt %.

In an embodiment, the bond material can include aluminum oxide and silicon oxide. For instance, the total content of aluminum oxide and silicon oxide relative to the total weight of the bond material can be at least 50 wt %, such as at least 52 wt %, at least 56 wt %, at least 58 wt %, or even at least 60 wt %. In another embodiment, the total content of aluminum oxide and silicon oxide may be not greater than 80 wt %, not greater than 77 wt %, not greater than 75 wt %, or even not greater than 73 wt %. It will be appreciated that the total content of aluminum oxide and silicon oxide can be within a range of any of the minimum to maximum percentages noted above, for instance, the total content can be within a range of 50 wt % to 80 wt %, within a range of 56 wt % to 75 wt %, or even within a range of 60 wt % to 73 wt %.

In certain instances, silicon oxide and aluminum oxide can be present in a particular weight percent ratio that may facilitate improved forming and/or performance of the abrasive article. The weight percent ratio of silicon oxide to aluminum oxide ($SiO_2:Al_2O_3$) may be for instance, not greater than 2.5:1, such as not greater than 2.2:1, or even not greater than 2:1. In other instances, the weight percentage ratio of silicon oxide to aluminum oxide can be at least 1:1, at least 1.3:1, at least 1.5:1, or even at least 1.7:1. It will be appreciated that the weight percent ratio of silicon oxide and aluminum oxide can be within a range of any of the minimum and maximum ratios noted above, for example, the ratio can be within a range of 1:1 to 2.5:1 or within a range of 1.3:1 to 2.2:1.

According to at least one embodiment, the bond material can include at least one alkaline earth oxide compound (RO) in a content that may facilitate improved forming and/or performance of the abrasive article. The total content of alkaline earth oxide compounds relative to the total weight of the bond material may be not greater than 3.0 wt %, not greater than 2.5 wt %, or not greater than 2 wt %. In another embodiment, the total content of alkaline earth oxide compounds (RO) can be at least 0.5 wt % or at least 0.8 wt %. It will be appreciated that the total content of alkaline earth oxide compounds can be within a range of any of the minimum to maximum percentages noted above, for instance, the total content can be within a range of 0.5 wt % to 3.0 wt % or within a range of 0.8 wt % to 2.5 wt %.

In a particular embodiment, the alkaline earth oxide compounds can include calcium oxide (CaO), magnesium oxide (MgO), barium oxide (BaO), strontium oxide (SrO), or the like. In a further embodiment, the bond material may not include more than three different alkaline earth oxide compounds. For example, the bond material may not include more than three different alkaline earth oxide compounds selected from the group of calcium oxide, magnesium oxide, barium oxide, and strontium oxide.

According to another embodiment, the bond material can include calcium oxide (CaO) in a content that facilitate improved forming and/or performance of the abrasive article. The content of calcium oxide can be at least 0.5 wt % for a total weight of the bond material, such as at least 0.8 wt %, or at least 1 wt %. In yet another embodiment, the content of calcium oxide may not be greater than 3 wt %, such as not greater than 2.8 wt %, not greater than 2.5 wt %, not greater than 2 wt %, or not greater than 1.7 wt %. It will be appreciated that the content of calcium oxide compounds can be within a range of any of the minimum to maximum percentages noted above, for instance, the total content can be within a range of 0.5 wt % to 3.0 wt %, within a range of 0.8 wt % to 2.5 wt %, or within a range of 1 wt % to 1.7 wt %.

According to another embodiment, the bond material can include an alkali oxide compound ($R_2O$). Exemplary alkali oxide compounds can include lithium oxide ($Li_2O$), sodium oxide ($Na_2O$), potassium oxide ($K_2O$), cesium oxide ($Cs_2O$), or the like. In a further embodiment, the bond material can include at least one alkali oxide compound. Particularly, the alkali oxide compound can be selected from the group of compounds consisting of lithium oxide ($Li_2O$), sodium oxide ($Na_2O$), potassium oxide ($K_2O$), cesium oxide ($Cs_2O$), and a combination thereof.

According to another embodiment, the total content of the alkali oxide compounds relative to the total weight of the bond material may not be greater than 25 wt %, not greater than 22 wt %, or not greater than 20 wt %. For another instance, the total content of the alkali oxide compounds can be at least 3 wt %, at least 5 wt %, at least 7 wt %, or at least 9 wt %. It will be appreciated that the total content of alkali oxide compounds can be within a range of any of the minimum to maximum percentages noted above, including for example within a range of 3 wt % to 25 wt % or within a range of 7 wt % to 22 wt %.

For instance, the bond material can include lithium oxide ($Li_2O$) in a content that can facilitate improved forming and/or performance of the abrasive article. The content of lithium oxide relative to the total weight of the bond material can be at least 1 wt %, such as at least 1.5 wt % or at least 2 wt %. In another instance, the content of lithium oxide may not be greater than 7 wt %, not greater than 6.5 wt %, not greater than 6 wt %, not greater than 5.5 wt %, or not greater than 5 wt %. It will be appreciated that the content of lithium oxide can be within a range of any of the minimum to maximum percentages noted above, including for example, within a range of 1 wt % to 7 wt % or 1.5 wt % to 6 wt %. In another embodiment, the bond material may include a trace amount of $Li_2O$ or be essentially free of $Li_2O$.

For another embodiment, the bond material can include sodium oxide ($Na_2O$) in a content that can facilitate improved forming and/or performance of the abrasive article. The content of sodium oxide relative to the total weight of the bond material can be for example, at least 3 wt %, at least 4 wt %, or at least 5 wt %. For another example, the content of sodium oxide may not be greater than 14 wt %, such as not greater than 13 wt %, not greater than 12 wt %, not greater than 11 wt %, or not greater than 10 wt %. It will be appreciated that the content of sodium oxide can be within a range of any of the minimum to maximum percentages noted above, including for example, within a range of 3 wt % to 14 wt % or within a range of 4 wt % to 11 wt %.

In another embodiment, the bond material can include potassium oxide ($K_2O$) in a content that can facilitate improved forming and or performance of the abrasive article. For instance, the content of potassium oxide for the total weight of the bond material can be at least 1 wt %, at least 1.5 wt %, or at least 2 wt %. For at least one non-limiting embodiment, the content of potassium oxide may be not greater than 7 wt %, such as not greater than 6.5 wt %, not greater than 6 wt %, not greater than 5.5 wt %, or not greater than 5 wt %. It will be appreciated that the content of potassium oxide can be within a range of any of the minimum to maximum percentages noted above, including for example, within a range of 1 wt % to 7 wt % or 1.5 wt % to 6.5 wt %.

In certain embodiments, the bond material can include phosphorous oxide ($P_2O_5$) in a content that can facilitate improved forming and/or performance of the abrasive article. For example, the content of phosphorous oxide for the total weight of the bond material may not be greater than 3.0 wt %, such as not greater than 2.0 wt % or not greater than 1.0 wt %. In a particular embodiment, the bond material may be essentially free of phosphorous oxide.

According to an embodiment, the bond material can include a composition essentially free of certain oxide compounds. For example, the bond material can include a composition essentially free of oxide compounds selected from the group consisting of $TiO_2$, $Fe_2O_3$, $MnO_2$, $ZrSiO_2$, $CoAl_2O_4$, and MgO.

In accordance with at least one embodiment, the abrasive particles can include nanocrystalline alumina having particular average crystallite sizes. For example, the average crystallite size of the nanocrystalline alumina particles may be not greater than 0.15 microns, such as not greater than 0.14 microns, not greater than 0.13 microns, or not greater than 0.12 microns, or even not greater than 0.11 microns. In another embodiment, the average crystallite size can be at least 0.01 microns, such as at least 0.02 microns, at least 0.05 microns, at least 0.06 microns, at least 0.07 microns, at least 0.08 microns, or at least about 0.09 microns. It will be appreciated that the average crystallite size can be within a range including any of the minimum to maximum values noted above. For example, the average crystallite size can be within a range of 0.01 microns to 0.15 microns, 0.05 microns to 0.14 microns, or 0.07 microns to 0.14 microns. In a particular embodiment, the crystallite size can be within a range of 0.08 microns to 0.14 microns.

The average crystallite size can be measured based on the uncorrected intercept method using scanning electron microscope (SEM) photomicrographs. Samples of abrasive grains are prepared by making a bakelite mount in expoxy resin then polished with diamond polishing slurry using a Struers Tegramin 30 polishing unit. After polishing the epoxy is heated on a hot plate, the polished surface is then thermally etched for 5 minutes at 150° C. below sintering temperature. Individual grains (5-10 grits) are mounted on the SEM mount then gold coated for SEM preparation. SEM photomicrographs of three individual abrasive particles are taken at approximately 50,000× magnification, then the uncorrected crystallite size is calculated using the following steps: 1) draw diagonal lines from one corner to the opposite corner of the crystal structure view, excluding black data band at bottom of photo (see, for example, FIGS. 7A and 7B); 2) measure the length of the diagonal lines as L1 and L2 to the nearest 0.1 centimeters; 3) count the number of grain boundaries intersected by each of the diagonal lines, (i.e., grain boundary intersections I1 and I2) and record this number for each of the diagonal lines, 4) determine a calculated bar number by measuring the length (in centimeters) of the micron bar (i.e., "bar length") at the bottom of each photomicrograph or view screen, and divide the bar length (in microns) by the bar length (in centimeters); 5) add the total centimeters of the diagonal lines drawn on photomicrograph (L1+L2) to obtain a sum of the diagonal lengths; 6) add the numbers of grain boundary intersections for both diagonal lines (I1+I2) to obtain a sum of the grain boundary intersections; 7) divide the sum of the diagonal lengths (L1+L2) in centimeters by the sum of grain boundary intersections (I1+I2) and multiply this number by the calculated bar number. This process is completed at least three different times for three different, randomly selected samples to obtain an average crystallite size.

As an example of calculating the bar number, assume the bar length as provided in a photo is 0.4 microns. Using a ruler the measured bar length in centimeters is 2 cm. The bar length of 0.4 microns is divided by 2 cm and equals 0.2 um/cm as the calculated bar number. The average crystalline size is calculated by dividing the sum of the diagonal lengths (L1+L2) in centimeters by the sum of grain boundary intersections (I1+I2) and multiply this number by the calculated bar number.

According to an embodiment, the nanocrystalline alumina can include at least 51 wt % alumina relative the total weight of the abrasive particles. For instance, the content of alumina within the nanocrystalline alumina can be at least about 60 wt %, at least 70 wt %, at least 80 wt %, at least about 85 wt %, or even higher, such as at least 90 wt %, at least 92 wt %, at least 93 wt %, or at least 94 wt %. In one non-limiting embodiment, the content of alumina may be not greater than 99.9 wt %, such as not be greater than 99 wt %, not greater than 98.5 wt %, not greater than 98 wt %, not greater than 97.5 wt %, not greater than 97 wt %, not greater than 96.5 wt %, or not greater than 96 wt %. It will be appreciated that the content of alumina can be within a range including any of the minimum to maximum percentages noted above. For example, the content can be within a range of 60 wt % to 99.9 wt %, within a range of 70 wt % to 99 wt %, within a range of 85 wt % to 98 wt %, or within a range of 90 wt % to 96.5 wt %. In a particular embodiment, the monocrystalline alumina can consist essentially of alumina, such as alpha alumina.

As described herein, the nanocrystalline alumina can have many particular features. These features can be similarly applied to the abrasive particles. For example, the abrasive particles can include a weight percent of alumina for the total weight of the abrasive particles that is similar to the content of the alumina relative to the total weight of the nanocrystalline alumina. For instance, the content of the alumina in the abrasive particles for the total weight of the abrasive particles can be at least at least 60 wt %, such as at least 70 wt %, at least 80 wt %, at least 85 wt %, at least 90 wt %, at least 92 wt %, at least 93 wt %, or at least 94 wt %. For another instance, the content of alumina in the abrasive particles may not be greater than 99.9 wt %, such as not be greater than 99 wt %, not greater than 98.5 wt %, not greater than 98 wt %, not greater than 97.5 wt %, not greater than 97 wt %, not greater than 96.5 wt %, or not greater than 96 wt %. It will be appreciated that the abrasive particles can include the alumina in the content within a range of minimum and maximum percentages noted above. For example, the content can be within a range of 60 wt % to 99.9 wt %, within a range of 70 wt % to 99 wt %, within a range of 85 wt % to 98 wt %, or within a range of 90 wt % to 96.5 wt %. In a particular embodiment, the abrasive particles can consist essentially of alumina, such as alpha alumina.

In accordance with an embodiment, the nanocrystalline alumina can include at least one additive. The additive can include a transition metal element, a rare-earth element, an alkali metal element, an alkaline earth metal element, silicon, or a combination thereof. In a further embodiment, the additive can be selected from the group consisting of a transition metal element, a rare-earth element, an alkali metal element, an alkaline earth metal element, silicon, and a combination thereof. It will be appreciated that the additive described in embodiments associated with the nanocrystalline alumina can be applied to the abrasive particles. In an embodiment, the abrasive particles can include one or more of the additives described herein.

In another embodiment, the additive can include a material including for example, magnesium, zirconium, calcium, silicon, iron, yttrium, lanthanum, cerium, or a combination thereof. In a further embodiment, the additive can include at least two materials selected from the group consisting of magnesium, zirconium, calcium, silicon, iron, yttrium, lanthanum, and cerium. It will be appreciated that the nanocrystalline alumina may consist essentially of alumina and one or more additives noted above. It will also be appreciated that the abrasive particles can consist essentially of alumina and one or more additives noted above.

In accordance with an embodiment, the total content of additives relative to the total weight of the nanocrystalline alumina particles may be not greater than 12 wt %, such as not be greater than 11 wt %, not greater than 10 wt %, not greater than 9.5 wt %, not greater than 9 wt %, not greater than 8.5 wt %, not greater than 8 wt %, not greater than 7.5 wt %, not greater than 7 wt %, not greater than 6.5 wt %, not greater than 6 wt %, not greater than 5.8 wt %, not greater than 5.5 wt %, or greater than 5.3 wt %, or not greater than 5 wt %. In another embodiment, the total content of additives can be at least 0.1 wt %, such as at least 0.3 wt %, at least 0.5 wt %, at least 0.7 wt %, at least 1 wt %, at least 1.3 wt %, at least 1.5 wt %, or at least 1.7 wt %, at least 2 wt %, at least 2.3 wt %, at least 2.5 wt %, at least 2.7 wt %, or even at least 3 wt %. It will be appreciated that the total content of additives within the nanocrystalline alumina can be within a range including any of the minimum to maximum percentages noted above. For example, the total content can be within a range 0.1 wt % to 12 wt %, such as within a range of 0.7 wt % to 9.5 wt %, or within a range of 1.3 wt % to 5.3 wt %. It will also be appreciated that the total content of the additives for the total weight of the abrasive particles can include the similar percentages or within a similar range of the embodiments herein.

In an embodiment, the additive can include magnesium oxide (MgO) in a content that can facilitate improving forming and/or performance of the abrasive article. The content of magnesium oxide relative to the total weight of the nanocrystalline alumina can be for example, at least 0.1 wt %, such as at least 0.3 wt %, at least 0.5 wt %, at least 0.7 wt %, or at least 0.8 wt %. For another instance, the content of magnesium oxide may be not greater than 5 wt %, such as not greater than 4.5 wt %, not greater than 4 wt %, not greater than 3.5 wt %, not greater than 3 wt %, or not greater than 2.8 wt %. It will be appreciated that the content of magnesium oxide can be within a range including any of the minimum to maximum percentages noted above. For example, the content can be within a range 0.1 wt % to 5 wt %, within a range of 0.3 wt % to 4.5 wt %, or within a range of 0.7 wt % to 2.8 wt %. In a particular embodiment, the nanocrystalline alumina may consist essentially of alumina and magnesium oxide within a range between any of the minimum and maximum values disclosed herein. It will also be appreciated that the content of magnesium oxide for the total weight of the abrasive articles can include any of the percentages or within any of the ranges described herein. In another particular embodiment, the abrasive particles may consist essentially of the nanocrystalline alumina and magnesium oxide within a range between any of the minimum and maximum values disclosed herein.

For another example, the additive can include zirconium oxide ($ZrO_2$), which may facilitate improved forming and/or performance of the abrasive article. The content of zirconium oxide for a total weight of the nanocrystalline alumina can be for example, at least 0.1 wt %, such as at least 0.3 wt %, at least 0.5 wt %, at least 0.7 wt %, at least 0.8 wt %, at least 1 wt %, at least 1.3 wt %, at least 1.5 wt %, at least 1.7 wt %, or at least 2 wt %. In another example, the content of zirconium oxide may be not greater than 8 wt %, not greater than 7 wt %, not greater than 6 wt %, not greater than 5.8 wt %, not greater than 5.5 wt %, or not greater than 5.2 wt %. It will be appreciated that the content of zirconium oxide can be within a range including any of the minimum to maximum percentages noted above. For example, the content can be within a range 0.1 wt % to 8 wt %, within a range of 0.3 wt % to 7 wt %, or within a range of 0.5 wt % to 5.8 wt %. In a particular embodiment, the nanocrystalline alumina may consist essentially of alumina and zirconium oxide within the range of embodiments herein. It will be also appreciated that the content of zirconium oxide for the total weight of the abrasive particles can include any of the percentages or within any of the ranges noted herein. In another particular embodiment, the abrasive particles may consist essentially of nanocrystalline alumina and ZrO2 within a range between any of the minimum and maximum percentages noted above.

In accordance with an embodiment, the additive can include magnesium oxide (MgO) and zirconium oxide ($ZrO_2$) in a particular additive ratio that can facilitate improved forming and/or performance of the abrasive article. The additive ratio ($MgO/ZrO_2$) can be a weight percent ratio of magnesium oxide to zirconium oxide, wherein MgO is the weight percent of MgO in the nanocrystalline alumina and $ZrO_2$ is the weight percent of $ZrO_2$ in the nanocrystalline alumina. For example, the ratio can be not greater than 1.5, such as not greater than 1.4, not greater than 1.3, not greater than 1.2, not greater than 1.1, not greater than 1, not greater than 0.95, not greater than 0.9, not greater than 0.85, not greater than 0.8, not greater than 0.75, not greater than 0.7, not greater than 0.65, not greater than 0.6, or not greater than 0.55. In another instance, the additive ratio ($MgO/ZrO_2$) can be at least about 0.01, at least 0.05, at least 0.1, at least 0.2, at least 0.3, at least 0.4, or at least 0.5. It will be appreciated that the additive ratio ($MgO/ZrO_2$) can be within a range including any of the minimum to maximum ratios noted above. For example, the additive ratio ($MgO/ZrO_2$) can be within a range 0.01 to 1.5, within a range of 0.1 to 1.1, or within a range of 0.3 to 0.95. In a particular embodiment, the nanocrystalline alumina can consist essentially of alumina, and magnesium oxide and zirconium oxide in the additive ratio within the range including any of the minimum to maximum ratios described herein. It will also be appreciated that the abrasive particles can include magnesium oxide (MgO) and zirconium oxide ($ZrO_2$) in the weight percent ratio disclosed herein. In a particular embodiment, the abrasive particles may consist essentially of nanocrystalline alumina, and magnesium oxide and zirconium oxide in the additive ratio within the range including any of the minimum to maximum ratios described herein.

According to one embodiment, the additive can include calcium oxide (CaO). The nanocrystalline alumina can include a certain content of calcium oxide relative to the total weight of the nanocrystalline alumina that can facilitate improved forming and/or performance of the abrasive article. For example, the content of calcium oxide can be at least 0.01 wt %, such as at least 0.05 wt %, at least about 0.07 wt %, at least 0.1 wt %, at least 0.15 wt %, at least 0.2 wt %, or at least 0.25 wt %. In another instance, the content may be not greater than 5 wt %, such as not greater than 4 wt %, not greater than 3 wt %, not greater than 2 wt %, not greater than 1 wt %, not greater than 0.7 wt %, or not greater than 0.5 wt %. It will be appreciated that the content of calcium oxide can be within a range including any of the minimum to maximum ratios noted above. For example, the content can be within a range 0.01 wt % to 5 wt %, within a range of 0.07 wt % to 3 wt %, or within a range of 0.15 wt % to 0.7 wt %. In a particular embodiment, the nanocrystalline alumina can consist essentially of alumina, and calcium oxide in the content within the range including any of the minimum to maximum percentages described herein. It will also be appreciated that the content of calcium oxide for the total weight of the abrasive particles can include any of the percentages or within any of the ranges noted herein. In another particular embodiment, the abrasive particles may consist essentially of nanocrystalline alumina and ZrO2 within a range between any of the minimum and maximum percentages noted above.

According to another embodiment, the additive can include magnesium oxide (MgO) and calcium oxide (CaO). The nanocrystalline alumina can have an additive ratio (CaO/MgO), wherein MgO is the weight percent of MgO in the nanocrystalline alumina and CaO is the weight percent of CaO in the nanocrystalline alumina. The additive ratio may facilitate improved forming and/or performance. For an instance, the additive ratio may be, not greater than 1, such as not greater than 0.95, not greater than 0.9, not greater than 0.85, not greater than 0.8, not greater than 0.75, not greater than 0.7, not greater than 0.65, not greater than 0.6, not greater than 0.55, not greater than 0.5, not greater than 0.45, or not greater than 0.4. For another example, the ratio can be at least 0.01, such as at least 0.05, at least 0.1, at least 0.15, at least 0.2, or at least 0.25. It will be appreciated that the additive ratio (CaO/MgO) can be within a range including any of the minimum and maximum ratios noted above. For example, the additive ratio can be within a range 0.01 to 1, within a range of 0.05 to 0.9, or within a range of 0.1 to 0.75. In a particular embodiment, the nanocrystalline alumina can consist essentially of alumina, and magnesium oxide and calcium oxide in the additive ratio within the range including any of the minimum and maximum ratios described herein. It will also be appreciated that the additive ratio of calcium oxide to magnesium oxide can include any of the ratios or within any of the ranges described herein. In another particular embodiment, the abrasive particles may consist essentially of nanocrystalline alumina, and calcium oxide and magnesium oxide in the additive ratio within a range between any of the minimum and maximum ratios noted above.

According to one embodiment, the nanocrystalline alumina can include a rare earth oxide. The examples of rare earth oxide can yttrium oxide, cerium oxide, praseodymium oxide, samarium oxide, ytterbium oxide, neodymium oxide, lanthanum oxide, gadolinium oxide, dysprosium oxide, erbium oxide, precursors thereof, or the like. In a particular embodiment, the rare earth oxide can be selected from the group consisting of yttrium oxide, cerium oxide, praseodymium oxide, samarium oxide, ytterbium oxide, neodymium oxide, lanthanum oxide, gadolinium oxide, dysprosium oxide, erbium oxide, precursors thereof, and combinations thereof. In another embodiment, the nanocrystalline alumina can be essentially free of a rare earth oxide and iron. In a further embodiment the abrasives particles can include a phase containing a rare earth, a divalent cation and alumina which may be in the form of a magnetoplumbite structure. An example of a magnetoplumbite structure is $MgLaAl_{11}O_{19}$.

In accordance with an embodiment, the nanocrystalline alumina can include a rare earth alumina crystallite. In another embodiment, the nanocrystalline alumina can include a rare earth aluminate phase. Still, according to another embodiment, the nanocrystalline alumina can include a spinel material. It will be appreciated that the abrasive particles can include a rare earth alumina crystallite, a rare earth aluminate phase, or a spinel material.

According to one embodiment, the nanocrystalline alumina can include nanocrystalline particles (e.g., grains or domains), which may be suitable for improving the formation and/or performance of an abrasive article. In certain embodiments, each nanocrystalline particle can include at least 50 vol % crystalline material, such as single crystalline material or polycrystalline material, for the total volume of each nanocrystalline particle. For example, each particle can include at least 75 vol % crystalline material, at least 85 vol % crystalline material, at least 90 vol % crystalline material, or at least 95 vol % crystalline material. In a particular embodiment, the nanocrystalline particles can consist essentially of crystalline material. It will be appreciated that the above described features of the nanocrystalline alumina can be applied to the abrasive particles. For example, each abrasive particle can include at least 50 vol % of crystalline material, such as single crystalline material or polycrystalline material, for the total volume of each abrasive particle. Moreover, it will be appreciated that the abrasive particles may consist essentially of a crystalline material including alpha alumina and one or more additives as described in the embodiments herein. More particularly, in at least one embodiment, the abrasive particles may consist essentially of a crystalline material consisting of alpha alumina and one or more additives as described in the embodiments herein.

In an embodiment, the nanocrystalline alumina can have certain physical properties including Vickers hardness and density. For example, Vickers hardness of the nanocrystalline alumina can be at least 18 GPa, at least 18.5 GPa, at least 19 GPa, or even at least 19.5 GPa. In another instance, Vickers hardness of the nanocrystalline alumina may not be greater than 26.5 GPa, such as not greater than 26 GPa, not greater than 25.5 GPa, not greater than 25 GPa, or even not greater than 24.5 GPa. It will be appreciated that the nanocrystalline alumina can have Vickers hardness within a range including any of the minimum to maximum values noted above. For example, Vickers hardness can be within a range of 18 GPa to 24.5 or within a range of 19 GPa to 24 GPa. In another embodiment, the physical properties of the nanocrystalline alumina can be similarly applied to the abrasive particles. For example the abrasive particles can have Vickers hardness noted above.

It will be appreciated that Vickers hardness is measured based on a diamond indentation method (well known in the art) of a polished surface of the abrasive grain. Samples of abrasive grains are prepared by making a bakelite mount in epoxy resin then polished with diamond polishing slurry using a Struers Tegramin 30 polishing unit. Using an Instron-Tukon 2100 Microhardness tester with a 500 gm load and a 50× objective lens, measure 5 diamond indents on five different abrasive particles. Measurement is in Vickers units and is converted to GPa by dividing the Vickers units by 100. Average and range of hardness are reported for a suitable sample size to make a statistically relevant calculation.

In an embodiment, the nanocrystalline alumina can have relative friability, which is breakdown of the nanocrystalline alumina relative to breakdown of the microcrystalline alumina having the same grit size, both of which breakdown is measured in the same manner as disclosed in more details below. The relative friability of the nanocrystalline alumina can be expressed in form of percentage, and that of the corresponding microcrystalline alumina is regarded as standard and set to be 100%. In an embodiment, the relative friability of the nanocrystalline alumina can be greater than 100%. For instance, the relative friability of the nanocrystalline alumina can be at least 102%, such as at least 105%, at least 108%, at least 110%, at least 112%, at least 115%, at least 120%, at least 125%, or at least 130%. In another instance, the relative friability of the nanocrystalline alumina may be not greater than 160%.

The relative friability is generally measured by milling a sample of the particles using tungsten carbide balls having an average diameter of ¾ inches for a given period of time, sieving the material resulting from the ball milling, and measuring the percent breakdown of the sample against that of a standard sample, which in the present embodiments, was a microcrystalline alumina sample having the same grit size.

Prior to ball milling, approximately 300 grams to 350 grams grains of a standard sample (e.g., microcrystalline alumina available as Cerpass® HTB from Saint-Gobain Corporation) are sieved utilizing a set of screens placed on a Ro-Tap® sieve shaker (model RX-29) manufactured by WS Tyler Inc. The grit sizes of the screens are selected in accordance with ANSI Table 3, such that a determinate number and types of sieves are utilized above and below the target particle size. For example, for a target particle size of grit 80, the process utilizes the following US Standard Sieve sizes, 1) 60, 2) 70; 3) 80; 4) 100; and 5) 120. The screens are stacked so that the grit sizes of the screens increase from top to bottom, and a pan is placed beneath the bottom screen to collect the grains that fall through all of the screens. The Ro-Tap® sieve shaker is run for 10 minutes at a rate of 287±10 oscillations per minute with the number of taps count being 150±10, and only the particles on the screen having the target grit size (referred to as target screen hereinafter) are collected as the target particle size sample. The same process is repeated to collect target particle size samples for the other test samples of material.

After sieving, a portion of each of the target particle size samples is subject to milling.

An empty and clean mill container is placed on a roll mill. The speed of the roller is set to 305 rpms, and the speed of the mill container is set to 95 rpms. About 3500 grams of flattened spherical tungsten carbide balls having an average diameter of ¾ inches are placed in the container. 100 grams of the target particle size sample from the standard material sample are placed in the mill container with the balls. The container is closed and placed in the ball mill and run for a duration of 1 minute to 10 minutes. Ball milling is stopped, and the balls and the grains are sieved using the Ro-Tap® sieve shaker and the same screens as used in producing the target particle size sample. The rotary tapper is run for 5 minutes using the same conditions noted above to obtain the target particles size sample, and all the particles that fall through the target screen are collected and weighed. The percent breakdown of the standard sample is the mass of the grains that passed through the target screen divided by the original mass of the target particle size sample (i.e., 100 grams). If the percent breakdown is within the range of 48% to 52%, a second 100 grams of the target particle size sample is tested using exactly the same conditions as used for the first sample to determine the reproducibility. If the second sample provides a percent breakdown within 48%-52%, the values are recorded. If the second sample does not provide a percent breakdown within 48% to 52%, the time of milling is adjusted, or another sample is obtained and the time of milling is adjusted until the percent breakdown falls within the range of 48%-52%. The test is repeated until two consecutive samples provide a percent breakdown within the range of 48%-52%, and these results are recorded.

The percent breakdown of a representative sample material (e.g., nanocrystalline alumina particles) is measured in the same manner as measuring the standard sample having the breakdown of 48% to 52%. The relative friability of the nanocrystalline alumina sample is the breakdown of the nanocrystalline sample relative to that of the standard microcrystalline sample.

In another instance, the nanocrystalline alumina can have a density of at least 3.85 g/cc, such as at least 3.9 g/cc or at least 3.94 g/cc. In another embodiment, the density of the nanocrystalline alumina may not be greater than 4.12 g/cc, such as not greater than 4.08 g/cc, not greater than 4.02 g/cc, or even not greater than 4.01 g/cc. It will be appreciated that the nanocrystalline alumina can have a density within a range including any of the minimum to maximum values described herein. For example, the density can be within a range of 3.85 g/cc to 4.12 g/cc or 3.94 g/cc to 4.01 g/cc. It will also be appreciated that the density of the abrasive particles can include any of the values or within any of the ranges descried herein.

According to an embodiment, the abrasive particles can include at least one type of abrasive particle. For example, the abrasive particles can include a blend including a first type of abrasive particle and a second type of abrasive particle. The first type of abrasive particle can include an abrasive particle comprising nanocrystalline alumina according to any of the embodiments herein. The second type of abrasive particle can include at least one material selected from the group consisting of oxides, carbides, nitrides, borides, oxycarbides, oxynitrides, superabrasives, carbon-based materials, agglomerates, aggregates, shaped abrasive particles, diluent particles, and a combination thereof. In a particular embodiment, the abrasive particles can consist essentially of nanocrystalline alumina.

In an embodiment, the body of the abrasive article of embodiments herein can include a fixed abrasive article. In another embodiment, the body can include a bonded abrasive article. The bonded abrasive article can include abrasive grains contained in a three-dimensional matrix of the bond material. The bonded abrasive body may be formed into any suitable shape as known by those of skill in the art, including but not limited to, abrasive wheels, cones, hones, cups, flanged-wheels, tapered cups, segments, mounted-point tools, discs, thin wheels, large diameter cut-off wheels, and the like.

According to an embodiment, the body of the abrasive article can include a certain content of the abrasive particles, which may facilitate improved formation and/or performance of an abrasive article. For instance, the content of the abrasive particles can be at least 2 vol % for the total volume of the body, at least 4 vol %, at least 6 vol %, at least 8 vol %, at least 10 vol %, at least 12 vol %, at least 14 vol %, at least 16 vol %, at least 18 vol %, at least 20 vol %, at least 25 vol %, at least 30 vol %, or even at least 35 vol %. In another instance, the content of the abrasive particles within the bonded abrasive body may be not greater than 65 vol %, such as not greater than 64 vol %, not greater than 62 vol %, not greater than 60 vol %, not greater than 58 vol %, not greater than 56 vol %, not greater than about 54 vol %, not greater than 52 vol %, not greater than 50 vol %, not greater than 48 vol %, not greater than 46 vol %, not greater than 44 vol %, not greater than 42 vol %, not greater than 40 vol %, not greater than 38 vol %, not greater than 36 vol %, not greater than 34 vol %, not greater than 32 vol %, not greater than 30 vol %, or greater than 28 vol %, not greater than 26 vol %, not greater than 24 vol %, not greater than 22 vol %, or not greater than 20 vol %. It will be appreciated that the content of the abrasive particles can be within a range including any of the minimum and maximum percentages noted above. For example, the content of the abrasive particles in the body can be within a range of 2 vol % to 64 vol %, within a range of 12 vol % to 62 vol %, or within a range of 20 vol % to 58 vol %.

In an embodiment, the content of the nanocrystalline alumina for the total volume of the body may be controlled to facilitate improved formation and/or performance of an abrasive article. For example, the content of nanocrystalline alumina can be at least 1 vol %, such as at least 2 vol %, at least 4 vol %, at least 6 vol %, at least 8 vol %, at least 10 vol %, at least 12 vol %, at least 14 vol %, at least 16 vol %, at least 18 vol %, at least 20 vol %, at least 25 vol %, at least 30 vol %, or at least 35 vol %. In another embodiment, the content of nanocrystalline alumina may be not greater than 65 vol %, such as not greater than 64 vol %, not greater than 62 vol %, not greater than 60 vol %, not greater than 58 vol %, not greater than 56 vol %, not greater than about 54 vol %, not greater than 52 vol %, not greater than 50 vol %, not greater than 48 vol %, not greater than 46 vol %, not greater than 44 vol %, not greater than 42 vol %, not greater than 40 vol %, not greater than 38 vol %, not greater than 36 vol %, not greater than 34 vol %, not greater than 32 vol %, not greater than 30 vol %, or greater than 28 vol %, not greater than 26 vol %, not greater than 24 vol %, not greater than 22 vol %, or not greater than 20 vol %. It will be appreciated that the content of the abrasive particles can be within a range including any of the minimum to maximum percentages noted above. For example, the content of the nanocrystalline alumina in the body can be within a range of 2 vol % to 64 vol %, within a range of 12 vol % to 62 vol %, or within a range of 20 vol % to 58 vol %.

According to an embodiment, the body can include a certain content of the bond material in embodiments herein. For example, the content of the bond material for a total volume of the body can be at least 1 vol %, such as at least 2 vol %, at least 5 vol %, at least 10 vol %, at least 20 vol %, at least 30 vol %, at least 35 vol %, at least 40 vol %, or at least 45 vol %. For another instance, the content of the bond material may be not greater than 98 vol %, such as not greater than 95 vol %, not greater than 90 vol %, not greater than 85 vol %, not greater than 80 vol %, not greater than 75 vol %, not greater than 70 vol %, not greater than 65 vol %, or not greater than 60 vol %, not greater than 55 vol %, not greater than 50 vol %, or not greater than 45 vol %, not greater than 40 vol %, or not greater than 35 vol %, not greater than 30 vol %, or not greater than 25 vol %. It will be appreciated that the content of the bond material can be within a range including any of the minimum to maximum percentages noted above. For example, the content of the bond material in the body can be within a range of 1 vol % to 98 vol %, within a range of 5 vol % to 85 vol %, or within a range of 20 vol % to 70 vol %.

The body of the abrasive article can be formed to have certain porosity. In an embodiment, the porosity can be at least 1 vol % for a total volume of the body. For example, the porosity can be at least 2 vol %, at least 4 vol %, at least 6 vol %, at least 8 vol %, at least 10 vol %, at least 12 vol %, at least 14 vol %, at least 16 vol %, at least 18 vol %, at least 20 vol %, at least 25 vol %, at least 30 vol %, at least 40 vol %, at least 45 vol %, at least 50 vol %, or at least 55 vol %. In another embodiment, the porosity of the body may be not greater than 80 vol %. For instance, the porosity may be not greater than 75 vol %, not greater than 70 vol %, not greater than 60 vol %, not greater than 55 vol %, not greater than 50 vol %, not greater than 45 vol %, not greater than 40 vol %, not greater than 35 vol %, not greater than 30 vol %, not greater than 25 vol %, not greater than 20 vol %, not greater than 15 vol %, not greater than 10 vol %, not greater than 5 vol %, or not greater than 2 vol %. It will be appreciated that the porosity of the body can be within a range including any of the minimum to maximum percentages noted above. For example, the content of the bond material in the body can be within a range of 1 vol % to 80 vol %, within a range of 8 vol % to 55 vol %, or within a range of 14 vol % to 30 vol %.

The porosity of the body can be in various forms. For instance, the porosity can be closed, open, or include closed porosity and open porosity. In an embodiment, the porosity can include a type of porosity selected from the group consisting of closed porosity, open porosity, and a combination thereof. In another embodiment, the majority of the porosity can include open porosity. In a particular embodiment, all of the porosity can essentially be open porosity. Still, in another embodiment, the majority of the porosity can include closed porosity. For example, all of the porosity can be essentially closed porosity.

The body can include pores having certain average pore sizes. In an embodiment, the average pore size may be not greater than 500 microns, such as not greater than 450 microns, not greater than 400 microns, not greater than 350 microns, not greater than 300 microns, not greater than 250 microns, not greater than 200 microns, not greater than 150 microns, or not greater than 100 microns. In another embodiment, the average pore size can be at least 0.01 microns, at least 0.1 microns, or at least 1 micron. It will be appreciated that the body can have an average pore size within a range including any of the minimum to maximum values noted above. For example, the average pore size of the body can be within a range of 0.01 microns to 500 microns, within a range of 0.1 microns to 350 microns, or within a range of 1 micron to 250 microns.

According to an embodiment, the abrasive particles of embodiments herein can include non-agglomerated particles, for example, the abrasive particles including the nanocrystalline alumina can be non-agglomerated particles. According to another embodiment, the abrasive particles can include agglomerated particles, for instance, the abrasive particles including the nanocrystalline alumina can be agglomerated particles.

In an embodiment, the abrasive particles including nanocrystalline alumina are shaped abrasive particles. The particles can include a two dimensional shape, a three-dimensional shape, or a combination thereof. Exemplary two dimensional shapes include regular polygons, irregular polygons, irregular shapes, triangles, partially-concave triangles, quadrilaterals, rectangles, trapezoids, pentagons, hexagons, heptagons, octagons, ellipses, Greek alphabet characters, Latin alphabet characters, Russian alphabet characters, and a combination thereof. In accordance with an embodiment, the abrasive particles can consist of any of the above noted two dimensional shapes. Exemplary three-dimensional shapes can include a polyhedron, a pyramid, an ellipsoid, a sphere, a prism, a cylinder, a cone, a tetrahedron, a cube, a cuboid, a rhombohedrun, a truncated pyramid, a truncated ellipsoid, a truncated sphere, a truncated cone, a pentahedron, a hexahedron, a heptahedron, an octahedron, a nonahedron, a decahedron, a Greek alphabet letter, a Latin alphabet character, a Russian alphabet character, a Kanji character, complex polygonal shapes, irregular shaped contours, a volcano shape, a monostatic shape, and a combination thereof. A monostatic shape can be a shape with a single stable resting position. In accordance with another embodiment, the abrasive particles can consist of any of the above noted three dimensional shapes. In a particular embodiment, the shaped abrasive particles can include a triangular two-dimensional shape. In another particular embodiment, the shaped abrasive particles can include a partially-concave triangular two-dimensional shape. The shaped abrasive particles and methods of forming can be found in US2013/0236725 A1 by Doruk O. Yener, et al. and US 2012/0167481 by Doruk O. Yener, et al., both of which are incorporated herein by reference in their entireties.

Figure 2:
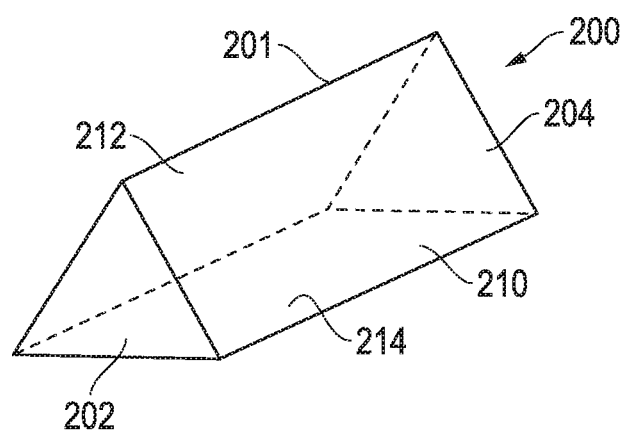
FIG. 2 includes perspective view of a shaped abrasive particle in accordance with an embodiment.

FIG. 2 includes a perspective view illustration of an exemplary shaped abrasive particle 200. The shaped abrasive particle can include a body 201 having a three-dimensional shape. The body 201 can be generally prismatic with a first end face 202 and a second end face 204. Further, the shaped abrasive particle 200 can include a first side face 210 extending between the first end face 202 and the second end face 204. A second side face 212 may extend between the first end face 202 and the second end face 204 adjacent to the first side face 210. As shown, the shaped abrasive particle 200 may also include a third side face 214 extending between the first end face 202 and the second end face 204 adjacent to the second side face 212 and the first side face 210. As shown, each end face 202, 204 of the shaped abrasive particle body 201 may be generally triangular in shape. Each side face 210, 212, 214 may be generally rectangular in shape. Further, the cross section of the shaped abrasive particle body 201 in a plane parallel to the end faces 202, 204 is generally triangular.

Figure 3:
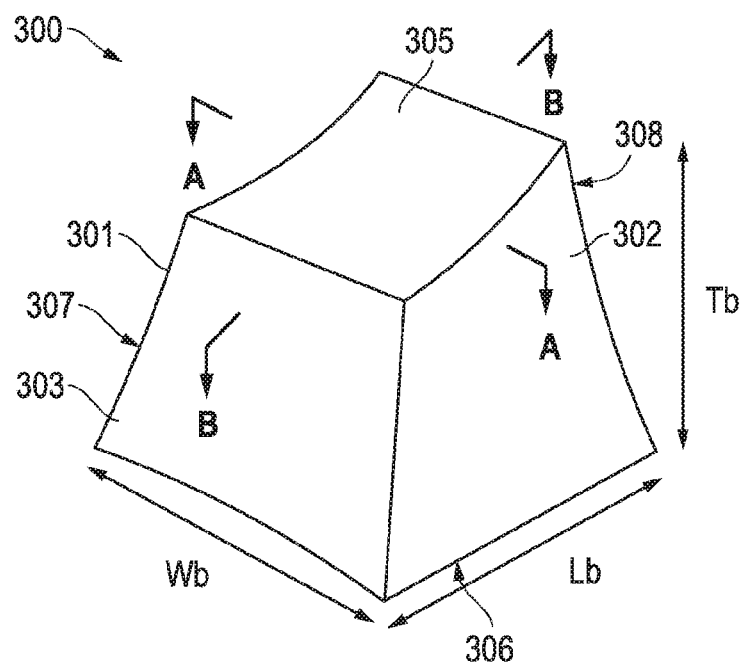
FIG. 3 includes a perspective view of a shaped abrasive particle in accordance with an embodiment.

FIG. 3 includes another perspective view illustration of an abrasive particle 300. As illustrated, the abrasive particle 300 can have a three-dimensional shape including a body 301 having an upper surface 305 and a bottom surface 306 opposite the upper surface 305. As further illustrated, the body 301 can be formed to have side surfaces 302, 303, 307, and 308 that extend between the upper surface 305 and the bottom surface 306.

As illustrated, the body 301 can have a body length (Lb), a body width (Wb), and a body thickness (Tb), and wherein Lb>Wb, Lb>Tb, and Wb>Tb. In a particular embodiment, the body can be formed to include a primary aspect ratio (Lb:Wb) of at least 1:1. For example, the aspect ratio (Lb:Wb) can be at least 2:1, at least 3:1, at least 5:1, or at least 10:1. In another instance, the aspect ratio (Lb:Wb) may be not greater than 1000:1 or not greater than 500:1. It will be appreciated that the aspect ratio (Lb:Wb) can be within a range including any of minimum to maximum values noted above, such as 1:1 to 1000:1. According to another embodiment, the body can have a secondary aspect ratio (Lb:Tb) of at least 1:1, at least 2:1, at least 3:1, at least 5:1, or at least 10:1. The secondary aspect ratio may be not greater than about 1000:1. It will be appreciated that the secondary aspect ratio (Lb:Tb) can be within a range including any of minimum to maximum values noted above, such as 1:1 to 1000:1. Still, according to another embodiment, the body can have a tertiary aspect ratio (Wb:Tb) of at least 1:1, at least 2:1, at least 3:1, at least 5:1, or at least 10:1. The tertiary aspect ratio may not be greater than about 1000:1. It will be appreciated that the tertiary aspect ratio (Wb:Tb) can be within a range including any of minimum to maximum values noted above, such as 1:1 to 1000:1.

In a further embodiment, at least one of the body length (Lb), the body width (Wb), and the body thickness (Tb) can have an average dimension of at least 0.1 microns. For example, the average dimension can be at least 1 micron, at least 10 microns, at least 50 microns, at least 100 microns, or at least 150 microns, at least 200 microns, at least 400 microns, at least 600 microns, at least 800 microns, or at least 1 mm. For another instance, the average dimension may not be greater than 20 mm, such as not greater than 18 mm, not greater than 16 mm, not greater than 14 mm, not greater than 12 mm, not greater than 10 mm, not greater than 8 mm, not greater than 6 mm, or not greater than 4 mm. It will be appreciated that the average dimension can be within a range including any of minimum to maximum values noted above, such as 1 micron to 20 mm, 10 microns to 18 mm, 50 microns to 14 mm, or 200 microns to 8 mm.

Figure 4:
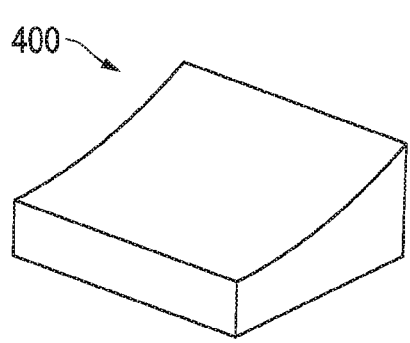
FIG. 4 includes a perspective view of a shaped abrasive particle in accordance with an embodiment.
Figure 5:
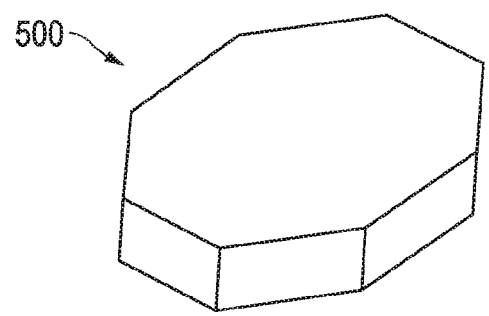
FIG. 5 includes a perspective view of a shaped abrasive particle in accordance with an embodiment.

In accordance with an embodiment, the body can include a cross-sectional shape in a plane defined by the body length and the body width. The cross-sectional shape can include triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof. In accordance with another embodiment, the body can include a cross-sectional shape in a plane defined by the body length and the body thickness. The cross-sectional shape can include triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof. The body can have a cross-sectional shape of any of the above noted shapes. For example, FIG. 4 includes a cross-sectional illustration of an abrasive particle 400 having a generally quadrilateral, and more particularly, a rectangular two-dimensional shape, as viewed in a plane defined by the width and the thickness. Alternatively, FIG. 5 includes a perspective view illustration of an abrasive particle 500 that can have a generally octagonal two-dimensional shape as viewed in a plane defined by the length and width.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implement using digital circuits, and vice versa.

Embodiment 1

An abrasive article comprising:
a body including:
a bond material comprising an inorganic material comprising a ceramic; and abrasive particles contained within the bond material, the abrasive particles comprising nanocrystalline alumina.

Embodiment 2

A method of forming an abrasive article comprising:
forming a mixture including:
a bond material comprising an inorganic material comprising a ceramic; and abrasive particles contained within the bond material, the abrasive particles comprising nanocrystalline alumina; and
forming the mixture into an abrasive article by heating the mixture to a forming temperature of at least about 900° C. and not greater than about 1200° C.

Embodiment 3

The abrasive article or method of embodiment 1 or 2, wherein the bond material comprises a vitreous material having an amorphous phase.

Embodiment 4

The abrasive article or method of embodiment 1 or 2, wherein the bond material comprises a non-vitreous material having a polycrystalline phase.

Embodiment 5

The abrasive article or method of embodiment 1 or 2, wherein the bond material comprises a mixture of polycrystalline and vitreous material.

Embodiment 6

The abrasive article or method of embodiment 1 or 2, wherein the bond material consists essentially of a vitreous material having an amorphous phase.

Embodiment 7

The abrasive article or method of embodiment 1 or 2, wherein the bond material comprises from not greater than about 30 wt % boron oxide ($B_2O_3$) for the total weight of the bond material or not greater than about 28 wt % or not greater than about 26 wt % or not greater than about 24 wt % or not greater than about 22 wt %.

Embodiment 8

The abrasive article or method of embodiment 1 or 2, wherein the bond material comprises at least about 5 wt % boron oxide ($B_2O_3$) for the total weight of the bond material or at least about 8 wt % or at least about 10 wt % or at least about 12 wt % or at least about 15 wt %.

Embodiment 9

The abrasive article or method of embodiment 1 or 2, wherein bond material comprises from not greater than about 80 wt % silicon oxide ($SiO_2$) for the total weight of the bond material or not greater than about 75 wt % or not greater than about 70 wt % or not greater than about 65 wt % or not greater than about 60 wt % or not greater than about 55 wt % or not greater than about 52 wt % or not greater than about 50 wt %.

Embodiment 10

The abrasive article or method of embodiment 1 or 2, wherein the bond material comprises at least about 25 wt % silicon oxide ($SiO_2$) for the total weight of the bond material or at least about 35 wt % or at least about 38 wt % or at least about 40 wt %.

Embodiment 11

The abrasive article or method of embodiment 1 or 2, wherein the bond comprises boron oxide ($B_2O_3$) and silicon oxide ($SiO_2$), and wherein the total content of boron oxide and silicon oxide is not greater than about 80 wt % or not greater than about 77 wt % or not greater than about 75 wt % or not greater than about 73 wt % not greater than 70 wt % not greater than 70 wt % not greater than 65 wt %.

Embodiment 12

The abrasive article or method of embodiment 1 or 2, wherein the bond comprises boron oxide ($B_2O_3$) and silicon oxide ($SiO_2$), and wherein the total content of boron oxide and silicon oxide is at least about 40 wt % or at least about 42 wt % or at least about 46 wt % or at least about 48 wt % or at least 50 wt %.

Embodiment 13

The abrasive article or method of embodiment 1 or 2, wherein the bond material comprises a ratio of weight percent silicon oxide ($SiO_2$):weight percent boron oxide ($B_2O_3$) of not greater than about 5.5:1 or not greater than about 5.2:1 or not greater than about 5:1 or not greater than 4.8:1.

Embodiment 14

The abrasive article or method of embodiment 1 or 2, wherein the bond material comprises a ratio of weight percent silicon oxide ($SiO_2$):weight percent boron oxide ($B_2O_3$) of at least about 1:1 or at least about 1.3:1 or at least about 1.5:1 or at least about 1.7:1 or at least 2.0:1 or at least 2.2:1.

Embodiment 15

The abrasive article or method of embodiment 1 or 2, wherein the bond comprises at least about 5 wt % aluminum oxide ($Al_2O_3$) for a total weight of the bond material or at least about 8 wt % or at least about 10 wt % or at least about 12 wt % or at least about 14 wt %.

Embodiment 16

The abrasive article or method of embodiment 1 or 2, wherein the bond comprises not greater than about 30 wt % aluminum oxide ($Al_2O_3$) for a total weight of the bond material or not greater than about 28 wt % or not greater than about 25 wt % or not greater than about 23 wt % or not greater than about 20 wt %.

Embodiment 17

The abrasive article or method of embodiment 1 or 2, wherein the bond comprises aluminum oxide ($Al_2O_3$) and silicon oxide ($SiO_2$), and wherein the total content of aluminum oxide and silicon oxide is at least about 50 wt % or at least about 52 wt % or at least about 56 wt % or at least about 58 wt % or at least about 60 wt %.

Embodiment 18

The abrasive article or method of embodiment 1 or 2, wherein the bond comprises aluminum oxide ($Al_2O_3$) and silicon oxide ($SiO_2$), and wherein the total content of aluminum oxide and silicon oxide is not greater than about 80 wt % or not greater than about 77 wt % or not greater than about 75 wt % or not greater than about 73 wt %.

Embodiment 19

The abrasive article or method of embodiment 1 or 2, wherein the bond material comprises a ratio of weight percent silicon oxide ($SiO_2$):weight percent aluminum oxide ($Al_2O_3$) of not greater than about 2.5:1 or not greater than about 2.2:1 or not greater than about 2:1.

Embodiment 20

The abrasive article or method of embodiment 1 or 2, wherein the bond material comprises a ratio of weight percent silicon oxide ($SiO_2$):weight percent aluminum oxide ($Al_2O_3$) of at least about 1:1 or at least about 1.3:1 or at least about 1.5:1 or at least about 1.7:1.

Embodiment 21

The abrasive article or method of embodiment 1 or 2, wherein the bond material comprises at least one alkaline earth oxide compound (RO), and wherein the total content of alkaline earth oxide compounds (RO) is not greater than about 3.0 wt % for a total weight of the bond material or not greater than about 2.5 wt % or not greater than about 2 wt %.

Embodiment 22

The abrasive article or method of embodiment 1 or 2, wherein the bond material comprises at least one alkaline earth oxide compound (RO), and wherein the total content of alkaline earth oxide compounds (RO) is at least about 0.5 wt % or at least 0.8 wt %.

Embodiment 23

The abrasive article or method of embodiment 1 or 2, wherein the bond material comprises not greater than about 3 different alkaline earth oxide compounds (RO) selected from the group of calcium oxide (CaO), magnesium oxide (MgO), barium oxide (BaO), strontium oxide (SrO).

Embodiment 24

The abrasive article or method of embodiment 1 or 2, wherein the bond material comprises at least about 0.5 wt % calcium oxide (CaO) for a total weight of the bond material or at least about 0.8 wt % or at least about 1 wt %.

Embodiment 25

The abrasive article or method of embodiment 1 or 2, wherein the bond material comprises not greater than about 3 wt % calcium oxide (CaO) for a total weight of the bond material or not greater than about 2.8 wt % or not greater than about 2.5 wt % or not greater than about 2 wt % or not greater than about 1.7 wt %.

Embodiment 26

The abrasive article or method of embodiment 1 or 2, wherein the bond material comprises an alkali oxide compound ($R_2O$) selected from the group of compounds consisting of lithium oxide ($Li_2O$), sodium oxide ($Na_2O$), potassium oxide ($K_2O$), and cesium oxide ($Cs_2O$) and a combination thereof.

Embodiment 27

The abrasive article or method of embodiment 1 or 2, wherein the bond material comprises at least one alkali oxide compound ($R_2O$), and wherein the total content of the alkali oxide compounds (RO) is not greater than about 25 wt % or not greater than about 22 wt % or not greater than about 20 wt %.

Embodiment 28

The abrasive article or method of embodiment 1 or 2, wherein the bond material comprises at least one alkali oxide compound ($R_2O$), and wherein the total content of the alkali oxide compounds (RO) is at least about 3 wt % or at least about 5 wt % or at least about 7 wt % or at least about 9 wt %.

Embodiment 29

The abrasive article or method of embodiment 1 or 2, wherein the bond material comprises at least about 1 wt % lithium oxide ($Li_2O$) for a total weight of the bond material or at least about 1.5 wt % or at least about 2 wt %.

Embodiment 30

The abrasive article or method of embodiment 1 or 2, wherein the bond material comprises not greater than about 7 wt % lithium oxide ($Li_2O$) for a total weight of the bond material or not greater than about 6.5 wt % or not greater than about 6 wt % or not greater than about 5.5 wt % or not greater than about 5 wt %.

Embodiment 31

The abrasive article or method of embodiment 1 or 2, wherein the bond material comprises at least about 3 wt % sodium oxide ($Na_2O$) for a total weight of the bond material or at least about 4 wt % or at least about 5 wt %.

Embodiment 32

The abrasive article or method of embodiment 1 or 2, wherein the bond material comprises not greater than about 14 wt % sodium oxide ($Na_2O$) for a total weight of the bond material or not greater than about 13 wt % or not greater than about 12 wt % or not greater than about 11 wt % or not greater than about 10 wt %.

Embodiment 33

The abrasive article or method of embodiment 1 or 2, wherein the bond material comprises at least about 1 wt % potassium oxide ($K_2O$) for a total weight of the bond material or at least about 1.5 wt % or at least about 2 wt %.

Embodiment 34

The abrasive article or method of embodiment 1 or 2, wherein the bond material comprises at least about 7 wt % potassium oxide ($K_2O$) for a total weight of the bond material or not greater than about 6.5 wt % or not greater than about 6 wt % or not greater than about 5.5 wt % or not greater than about 5 wt %.

Embodiment 35

The abrasive article or method of embodiment 1 or 2, wherein the bond material comprises not greater than about 3.0 wt % phosphorous oxide ($P_2O_5$) or wherein the bond material is essentially free of phosphorus oxide ($P_2O_5$).

Embodiment 36

The abrasive article or method of embodiment 1 or 2, wherein the bond material comprises a composition essentially free of oxide compounds selected from the group consisting of $TiO_2$, $Fe_2O_3$, $MnO_2$, $ZrSiO_2$, $CoAl_2O_4$, and MgO.

Embodiment 37

The abrasive article or method of embodiment 1 or 2, wherein the bond material comprises a forming temperature of not greater than about 1200° C. or not greater than about 1175° C. or not greater than about 1150° C. or not greater than about 1125° C. or not greater than about 1100° C.

Embodiment 38

The abrasive article or method of embodiment 1 or 2, wherein the bond material comprises a forming temperature of at least about 900° C. or at least about 950° C. or at least about 975° C.

Embodiment 39

The abrasive article or method of embodiment 1 or 2, wherein the abrasive particles comprise nanocrystalline alumina having an average crystallite size of not greater than about 0.15 microns or not greater than about 0.14 microns or not greater than about 0.13 microns or not greater than 0.12 or not greater than 0.11 or not greater than 0.1.

Embodiment 40

The abrasive article or method of embodiment 1 or 2, wherein the abrasive particles comprise nanocrystalline alumina having an average crystallite size of at least about 0.01 microns or at least about 0.02 microns or at least about 0.05 microns or at least about 0.06 microns or at least about 0.07 microns or at least about 0.08 microns or at least about 0.09 microns.

Embodiment 41

The abrasive article or method of embodiment 1 or 2, wherein the nanocrystalline alumina comprises at least about 51 wt % alumina for the total weight of the particles or at least about 60 wt % or at least about 70 wt % or at least about 80 wt % or at least about 85 wt % or at least about 90 wt % or at least about 92 wt % or at least about 93 wt % or at least about 94 wt %.

Embodiment 42

The abrasive article or method of embodiment 1 or 2, wherein the nanocrystalline alumina comprises not greater than about 99.9 wt % alumina for the total weight of the particles or not greater than about 99 wt % or not greater than about 98.5 wt % or not greater than about 98 wt % or not greater than about 97.5 wt % or not greater than about 97 wt % or not greater than about 96.5 wt % or not greater than about 96 wt %.

Embodiment 43

The abrasive article or method of embodiment 1 or 2, wherein the nanocrystalline alumina comprises at least one additive selected from the group consisting of a transition metal element, a rare-earth element, an alkali metal element, an alkaline earth metal element, silicon, and a combination thereof.

Embodiment 44

The abrasive article or method of embodiment 43, wherein the additive comprises a material selected from the group consisting of magnesium, zirconium, calcium, silicon, iron, yttrium, lanthanum, cerium, and a combination thereof.

Embodiment 45

The abrasive article or method of embodiment 43, wherein the additive includes at least two materials selected from the group consisting of magnesium, zirconium, calcium, silicon, iron, yttrium, lanthanum, and cerium.

Embodiment 46

The abrasive article or method of embodiment 43, wherein the nanocrystalline alumina comprises a total content of additive of not greater than about 12 wt % for a total weight of the nanocrystalline alumina particles or not greater than about 11 wt % or not greater than about 10 wt % or not greater than about 9.5 wt % or not greater than about 9 wt % or not greater than about 8.5 wt % or not greater than about 8 wt % or not greater than about 7.5 wt % or not greater than about 7 wt % or not greater than about 6.5 wt % or not greater than about 6 wt % or not greater than about 5.8 wt % or not greater than about 5.5 wt % or not greater than about 5.3 wt % or not greater than about 5 wt %.

Embodiment 47

The abrasive article or method of embodiment 43, wherein the nanocrystalline alumina comprises a total content of additive of at least about 0.1 wt % for a total weight of the nanocrystalline alumina particles or at least about 0.3 wt % or at least about 0.5 wt % or at least about 0.7 wt % or at least about 1 wt % or at least about 1.3 wt % or at least about 1.5 wt % or at least about 1.7 wt % or at least about 2 wt % or at least about 2.3 wt % or at least about 2.5 wt % or at least about 2.7 wt % or at least about 3 wt %.

Embodiment 48

The abrasive article or method of embodiment 43, wherein the additive includes magnesium oxide (MgO).

Embodiment 49

The abrasive article or method of embodiment 48, wherein the nanocrystalline alumina comprises at least about 0.1 wt % MgO for a total weight of the nanocrystalline alumina or at least about 0.3 wt % or at least about 0.5 wt % or at least about 0.7 wt % or at least about 0.8 wt %.

Embodiment 50

The abrasive article or method of embodiment 48, wherein the nanocrystalline alumina comprises not greater than about 5 wt % MgO for a total weight of the nanocrystalline alumina or not greater than about 4.5 wt % or not greater than about 4 wt % or not greater than about 3.5 wt % or not greater than about 3 wt % or not greater than about 2.8 wt %.

Embodiment 51

The abrasive article or method of embodiment 43, wherein the additive includes zirconium oxide ($ZrO_2$).

Embodiment 52

The abrasive article or method of embodiment 51, wherein the nanocrystalline alumina comprises at least about 0.1 wt % $ZrO_2$ for a total weight of the nanocrystalline alumina or at least about 0.3 wt % or at least about 0.5 wt % or at least about 0.7 wt % or at least about 0.8 wt % or at least about 1 wt % or at least about 1.3 wt % or at least about 1.5 wt % or at least about 1.7 wt % or at least about 2 wt %.

Embodiment 53

The abrasive article or method of embodiment 51, wherein the nanocrystalline alumina comprises not greater than about 8 wt % $ZrO_2$ for a total weight of the nanocrystalline alumina or not greater than about 7 wt % or not greater than about 6 wt % or not greater than about 5.8 wt % or not greater than about 5.5 wt % or not greater than about 5.2 wt %.

Embodiment 54

The abrasive article or method of embodiment 43, wherein the additive includes magnesium oxide (MgO) and zirconium oxide ($ZrO_2$).

Embodiment 55

The abrasive article or method of embodiment 54, wherein the nanocrystalline alumina comprises an additive ratio ($MgO/ZrO_2$) of not greater than 1.5, wherein MgO is the weight percent of MgO in the nanocrystalline alumina and $ZrO_2$ is the weight percent of $ZrO_2$ in the nanocrystalline alumina, wherein the additive ratio is ($MgO/ZrO_2$) is not greater than about 1.4 or not greater than about 1.3 or not greater than about 1.2 or not greater than about 1.1 or not greater than about 1 or not greater than about 0.95 or not greater than about 0.9 or not greater than about 0.85 or not greater than about 0.8 or not greater than about 0.75 or not greater than about 0.7 or not greater than about 0.65 not greater than about 0.6 or not greater than about 0.55.

Embodiment 56

The abrasive article or method of embodiment 54, wherein the nanocrystalline alumina comprises an additive ratio ($MgO/ZrO_2$) of at least about 0.01, wherein MgO is the weight percent of MgO in the nanocrystalline alumina and $ZrO_2$ is the weight percent of $ZrO_2$ in the nanocrystalline alumina, wherein the additive ratio is ($MgO/ZrO_2$) is at least about 0.05 or at least about 0.1 or at least about 0.2 or at least about 0.3 or at least about 0.4 or at least about 0.5.

Embodiment 57

The abrasive article or method of embodiment 43, wherein the additive includes calcium oxide (CaO).

Embodiment 58

The abrasive article or method of embodiment 57, wherein the nanocrystalline alumina comprises at least about 0.01 wt % CaO for a total weight of the nanocrystalline alumina or at least about 0.05 wt % or at least about 0.07 wt % or at least about 0.1 wt % or at least about 0.15 wt % or at least about 0.2 wt % or at least about 0.25 wt %.

Embodiment 59

The abrasive article or method of embodiment 57, wherein the nanocrystalline alumina comprises not greater than about 5 wt % CaO for a total weight of the nanocrystalline alumina or not greater than about 4 wt % or not greater than about 3 wt % or not greater than about 2 wt % or not greater than about 1 wt % or not greater than about 0.7 wt % or not greater than about 0.5 wt %.

Embodiment 60

The abrasive article or method of embodiment 43, wherein the additive includes magnesium oxide (MgO) and calcium oxide (CaO).

Embodiment 61

The abrasive article or method of embodiment 60, wherein the nanocrystalline alumina comprises an additive ratio (CaO/MgO) of not greater than 1, wherein MgO is the weight percent of MgO in the nanocrystalline alumina and CaO is the weight percent of CaO in the nanocrystalline alumina, wherein the additive ratio is (CaO/MgO) is not greater than about 0.95 or not greater than about 0.9 or not greater than about 0.85 or not greater than about 0.8 or not greater than about 0.75 or not greater than about 0.7 or not greater than about 0.65 not greater than about 0.6 or not greater than about 0.55 or not greater than about 0.5 or not greater than about 0.45 not greater than about 0.4.

Embodiment 62

The abrasive article or method of embodiment 60, wherein the nanocrystalline alumina comprises an additive ratio (CaO/MgO) of at least about 0.01, wherein MgO is the weight percent of MgO in the nanocrystalline alumina and CaO is the weight percent of CaO in the nanocrystalline alumina, wherein the additive ratio is (CaO/MgO) is at least about 0.05 or at least about 0.1 or at least about 0.15 or at least about 0.2 or at least about 0.25.

Embodiment 63

The abrasive article or method of embodiment 1 or 2, wherein the nanocrystalline alumina comprises a rare earth oxide selected from the group consisting of yttrium oxide, cerium oxide, praseodymium oxide, samarium oxide, ytterbium oxide, neodymium oxide, lanthanum oxide, gadolinium oxide, dysprosium oxide, erbium oxide, precursors thereof, and combinations thereof.

Embodiment 64

The abrasive article or method of embodiment 1 or 2, wherein the nanocrystalline alumina comprises a rare earth alumina crystallite.

Embodiment 65

The abrasive article or method of embodiment 1 or 2, wherein the nanocrystalline alumina comprises a spinel material.

Embodiment 66

The abrasive article or method of embodiment 1 or 2, wherein the nanocrystalline material comprises nanocrystalline particles and each particle includes at least about 50 vol % crystalline or polycrystalline material for the total volume of each particle or at least about 75 vol % crystalline or polycrystalline material or at least about 85 vol % crystalline or polycrystalline material or at least about 90 vol % crystalline or polycrystalline material or at least about 95 vol % crystalline or polycrystalline material or wherein each particle consists essentially of crystalline or polycrystalline material.

Embodiment 67

The abrasive article or method of embodiment 1 or 2, wherein the nanocrystalline alumina is essentially free of a rare earth oxide and iron.

Embodiment 68

The abrasive article or method of embodiment 1 or 2, wherein the nanocrystalline alumina comprises a rare earth aluminate phase.

Embodiment 69

The abrasive article or method of embodiment 1 or 2, wherein the nanocrystalline alumina comprises a Vickers hardness of at least about 18 GPa or at least about 18.5 GPa or at least 19 GPa or at least about 19.5 GPa.

Embodiment 70

The abrasive article or method of embodiment 1 or 2, wherein the nanocrystalline alumina comprises a density of at least about 3.85 g/cc or at least about 3.9 g/cc or at least about 3.94 g/cc.

Embodiment 71

The abrasive article or method of embodiment 1 or 2, wherein the body comprises a fixed abrasive article.

Embodiment 72

The abrasive article or method of embodiment 1 or 2, wherein the body comprises a bonded abrasive article including the abrasive grains contained in a three-dimensional matrix of the bond material.

Embodiment 73

The abrasive article or method of embodiment 1 or 2, wherein the body comprises at least about 1 vol % abrasive particles for a total volume of the body or at least about 2 vol % or at least about 4 vol % or at least about 6 vol % or at least about 8 vol % or at least about 10 vol % or at least about 12 vol % or at least about 14 vol % or at least about 16 vol %, at least about 18 vol % or at least about 20 vol % or at least about 25 vol % or at least about 30 vol % or at least about 35 vol %.

Embodiment 74

The abrasive article or method of embodiment 1 or 2, wherein the body comprises not greater than about 65 vol % abrasive particles for a total volume of the body or not greater than about 64 vol % or not greater than about 62 vol % or not greater than about 60 vol % or not greater than about 58 vol % or not greater than about 56 vol % or not greater than about 54 vol % or not greater than about 52 vol % or not greater than about 50 vol % or not greater than about 48 vol % or not greater than about 46 vol % or not greater than about 44 vol % or not greater than about 42 vol % or not greater than about 40 vol % or not greater than about 38 vol % or not greater than about 36 vol % or not greater than about 34 vol % or not greater than about 32 vol % or not greater than about 30 vol % or not greater than about 28 vol % or not greater than about 26 vol % or not greater than about 24 vol % or not greater than about 22 vol % or not greater than about 20 vol %.

Embodiment 75

The abrasive article or method of embodiment 1 or 2, wherein the body comprises at least about 1 vol % nanocrystalline alumina for a total volume of the body or at least about 2 vol % or at least about 4 vol % or at least about 6 vol % or at least about 8 vol % or at least about 10 vol % or at least about 12 vol % or at least about 14 vol % or at least about 16 vol % at least about 18 vol % or at least about 20 vol % or at least about 25 vol % or at least about 30 vol % or at least about 35 vol %.

Embodiment 76

The abrasive article or method of embodiment 1 or 2, wherein the body comprises not greater than about 65 vol % nanocrystalline alumina for a total volume of the body or not greater than about 64 vol % or not greater than about 62 vol % or not greater than about 60 vol % or not greater than about 58 vol % or not greater than about 56 vol % or not greater than about 54 vol % or not greater than about 52 vol % or not greater than about 50 vol % or not greater than about 48 vol % or not greater than about 46 vol % or not greater than about 44 vol % or not greater than about 42 vol % or not greater than about 40 vol % or not greater than about 38 vol % or not greater than about 36 vol % or not greater than about 34 vol % or not greater than about 32 vol % or not greater than about 30 vol % or not greater than about 28 vol % or not greater than about 26 vol % or not greater than about 24 vol % or not greater than about 22 vol % or not greater than about 20 vol %.

Embodiment 77

The abrasive article or method of embodiment 1 or 2, wherein the abrasive particles include a blend including a first type of abrasive particle including the nanocrystalline alumina and a second type of abrasive particle selected from the group consisting of oxides, carbides, nitrides, borides, oxycarbides, oxynitrides, superabrasives, carbon-based materials, agglomerates, aggregates, shaped abrasive particles, and a combination thereof.

Embodiment 78

The abrasive article or method of embodiment 1 or 2, wherein the abrasive particles consist essentially of nanocrystalline alumina.

Embodiment 79

The abrasive article or method of embodiment 1 or 2, wherein the body comprises at least about 1 vol % bond material for a total volume of the body or at least about 2 vol % or at least about 5 vol % or at least about 10 vol % or at least about 20 vol % or at least about 30 vol % or at least about 35 vol % or at least about 40 vol % or at least about 45 vol %.

Embodiment 80

The abrasive article or method of embodiment 1 or 2, wherein the body comprises not greater than about 98 vol % bond material for a total volume of the body or not greater than about 95 vol % or not greater than about 90 vol % or not greater than about 85 vol % or not greater than about 80 vol % or not greater than about 75 vol % or not greater than about 70 vol % or not greater than about 65 vol % or not greater than about 60 vol % or not greater than about 55 vol % or not greater than about 50 vol % or not greater than about 45 vol % or not greater than about 40 vol % or not greater than about 35 vol % or not greater than about 30 vol % or not greater than about 25 vol %.

Embodiment 81

The abrasive article or method of embodiment 1 or 2, wherein the wherein the body comprises at least about 1 vol % porosity for a total volume of the body or at least about 2 vol % or at least about 4 vol % or at least about 6 vol % or at least about 8 vol % or at least about 10 vol % or at least about 12 vol % or at least about 14 vol % or at least about 16 vol % or at least about 18 vol % or at least about 20 vol % or at least about 25 vol % or at least about 30 vol % or at least about 40 vol % or at least about 45 vol % or at least about 50 vol % or at least about 55 vol %.

Embodiment 82

The abrasive article or method of embodiment 1 or 2, wherein the body comprises not greater than about 80 vol % porosity for a total volume of the body or not greater than about 75 vol % or not greater than about 70 vol % or not greater than about 60 vol % or not greater than about 55 vol % or not greater than about 50 vol % or not greater than about 45 vol % or not greater than about 40 vol % or not greater than about 35 vol % or not greater than about 30 vol % or not greater than about 25 vol % or not greater than about 20 vol % or not greater than about 15 vol % or not greater than about 10 vol % or not greater than about 5 vol % or not greater than about 2 vol %.

Embodiment 83

The abrasive article or method of embodiment 1 or 2, wherein the body comprises porosity comprises a type of porosity selected from the group consisting of closed porosity, open porosity, and a combination thereof.

Embodiment 84

The abrasive article or method of embodiment 1 or 2, wherein the body comprises porosity, and wherein a majority of the porosity is open porosity or wherein essentially all of the porosity is open porosity.

Embodiment 85

The abrasive article or method of embodiment 1 or 2, wherein the body comprises porosity and the majority of the porosity is closed porosity, wherein essentially all of the porosity is closed porosity.

Embodiment 86

The abrasive article or method of embodiment 1 or 2, wherein the body comprises porosity having an average pore size of not greater than about 500 microns or not greater than 450 microns or not greater than about 400 microns or not greater than about 350 microns or not greater than about 300 microns or not greater than 250 microns or not greater than about 200 microns or not greater than about 150 microns or not greater than about 100 microns.

Embodiment 87

The abrasive article or method of embodiment 1 or 2, wherein the body comprises porosity having an average pore size of at least about 0.01 microns or at least about 0.1 microns or at least about 1 micron.

Embodiment 88

The abrasive article or method of embodiment 1 or 2, wherein the abrasive particles comprising nanocrystalline alumina are non-agglomerated particles.

Embodiment 89

The abrasive article or method of embodiment 1 or 2, wherein the abrasive particles comprising nanocrystalline alumina are agglomerated particles.

Embodiment 90

The abrasive article or method of embodiment 1 or 2, wherein the abrasive particles comprising nanocrystalline alumina are shaped abrasive particles.

Embodiment 91

The abrasive article or method of embodiment 90, wherein the shaped abrasive particles comprise a two dimensional shape selected from the group consisting of regular polygons, irregular polygons, irregular shapes, triangles, partially-concave triangles, quadrilaterals, rectangles, trapezoids, pentagons, hexagons, heptagons, octagons, ellipses, Greek alphabet characters, Latin alphabet characters, Russian alphabet characters, and a combination thereof.

Embodiment 92

The abrasive article or method of embodiment 90, wherein the shaped abrasive particles comprise a three-dimensional shape selected from the group consisting of a polyhedron, a pyramid, an ellipsoid, a sphere, a prism, a cylinder, a cone, a tetrahedron, a cube, a cuboid, a rhombohedrun, a truncated pyramid, a truncated ellipsoid, a truncated sphere, a truncated cone, a pentahedron, a hexahedron, a heptahedron, an octahedron, a nonahedron, a decahedron, a Greek alphabet letter, a Latin alphabet character, a Russian alphabet character, a Kanji character, complex polygonal shapes, irregular shaped contours, a volcano shape, a monostatic shape, and a combination thereof, a monostatic shape is a shape with a single stable resting position.

Embodiment 93

The abrasive article or method of embodiment 90, wherein the shaped abrasive particle comprises a triangular two-dimensional shape.

Embodiment 94

The abrasive article or method of embodiment 90, wherein the shaped abrasive particle comprises a partially-concave triangular two-dimensional shape.

Embodiment 95

The abrasive article or method of embodiment 90, wherein the shaped abrasive particle includes body having a body length (Lb), a body width (Wb), and a body thickness (Tb), and wherein Lb>Wb, Lb>Tb, and Wb>Tb.

Embodiment 96

The abrasive article or method of embodiment 95, wherein the body comprises a primary aspect ratio (Lb:Wb) of at least about 1:1 or at least about 2:1 or at least about 3:1 or at least about 5:1 or at least about 10:1, and not greater than about 1000:1.

Embodiment 97

The abrasive article or method of embodiment 95, wherein the body comprises a secondary aspect ratio (Lb:Tb) of at least about 1:1 or at least about 2:1 or at least about 3:1 or at least about 5:1 or at least about 10:1, and not greater than about 1000:1.

Embodiment 98

The abrasive article or method of embodiment 95, wherein the body comprises a tertiary aspect ratio (Wb:Tb) of at least about 1:1 or at least about 2:1 or at least about 3:1 or at least about 5:1 or at least about 10:1, and not greater than about 1000:1.

Embodiment 99

The abrasive article or method of embodiment 95, wherein at least one of the body length (Lb), the body width (Wb), and the body thickness (Tb) has an average dimension of at least about 0.1 microns or at least about 1 micron or at least about 10 microns or at least about 50 microns or at least about 100 microns or at least about 150 microns or at least about 200 microns or at least about 400 microns or at least about 600 microns or at least about 800 microns or at least about 1 mm, and not greater than about 20 mm or not greater than about 18 mm or not greater than about 16 mm or not greater than about 14 mm or not greater than about 12 mm or not greater than about 10 mm or not greater than about 8 mm or not greater than about 6 mm or not greater than about 4 mm.

Embodiment 100

The abrasive article or method of embodiment 95, wherein the body comprises a cross-sectional shape in a plane defined by the body length and the body width selected from the group consisting of triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof.

Embodiment 101

The abrasive article or method of embodiment 95, wherein the body comprises a cross-sectional shape in a plane defined by the body length and the body thickness selected from the group consisting of triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof.

Embodiment 102

The abrasive article or method of embodiment 1 or 2, wherein the body comprises a filler selected from the group consisting of powders, granules, spheres, fibers, pore formers, hollow particles, and a combination thereof.

Embodiment 103

The abrasive article or method of embodiment 1 or 2, wherein the body has a shape selected from the group consisting of wheels, hones, cones, cups, flanged-wheels, tapered cups, discs, segments, mounted points, and a combination thereof.

Example 1

Figure 6A:
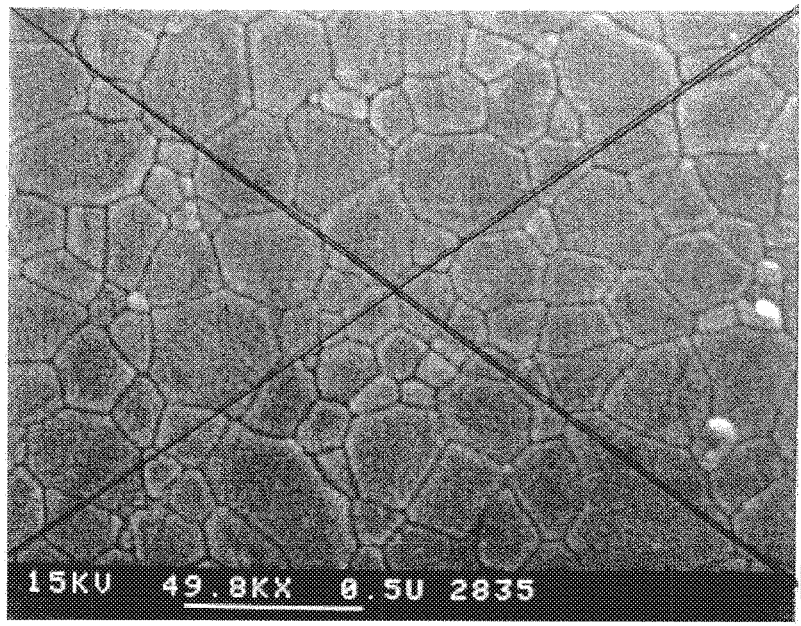
FIG. 6A includes a SEM image of conventional microcrystalline alumina grains.
Figure 6B:
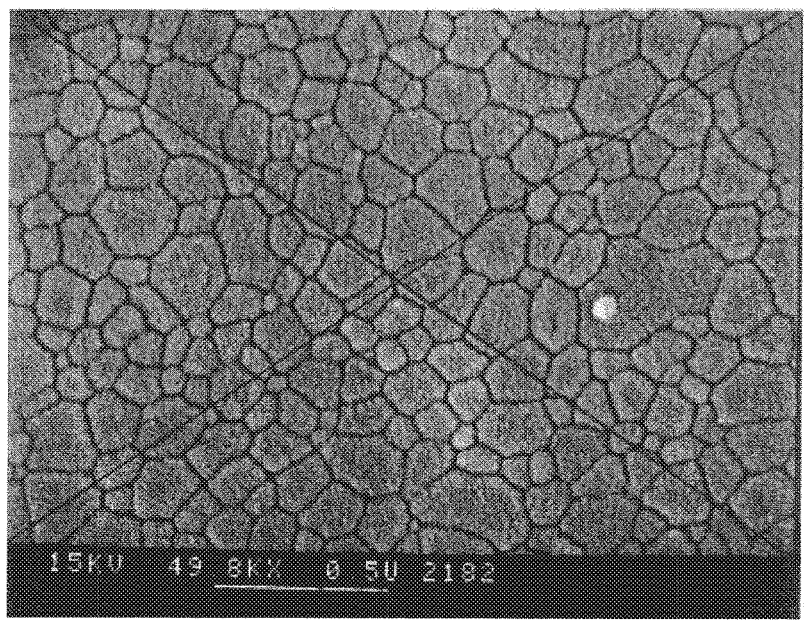
FIG. 6B includes a SEM image of nanocrystalline alumina grains in accordance with an embodiment.

FIGS. 6A and 6B include scanning electron microscopy (SEM) images of polished sections of the conventional microcrystalline alumina grains (FIG. 6A) and the nanocrystalline alumina grains (FIG. 6B) representative of embodiments herein. As illustrated, the average crystallite size for the microcrystalline alumina (MCA) is approximately 0.2 microns, while the average crystallite size of the nanocrystalline alumina (NCA) is approximately 0.1 microns.

Figure 7A:
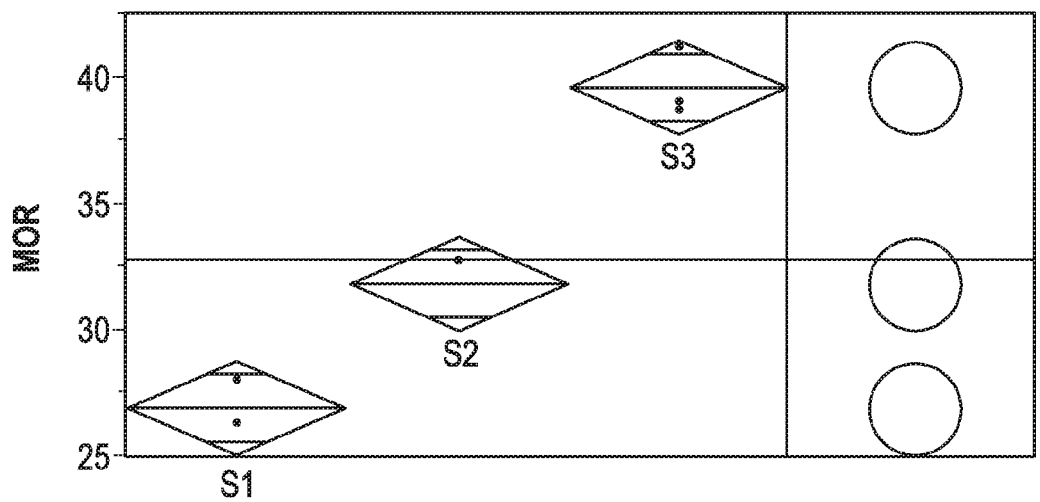
FIG. 7A includes a plot of modulus of rupture of abrasive samples.
Figure 7B:
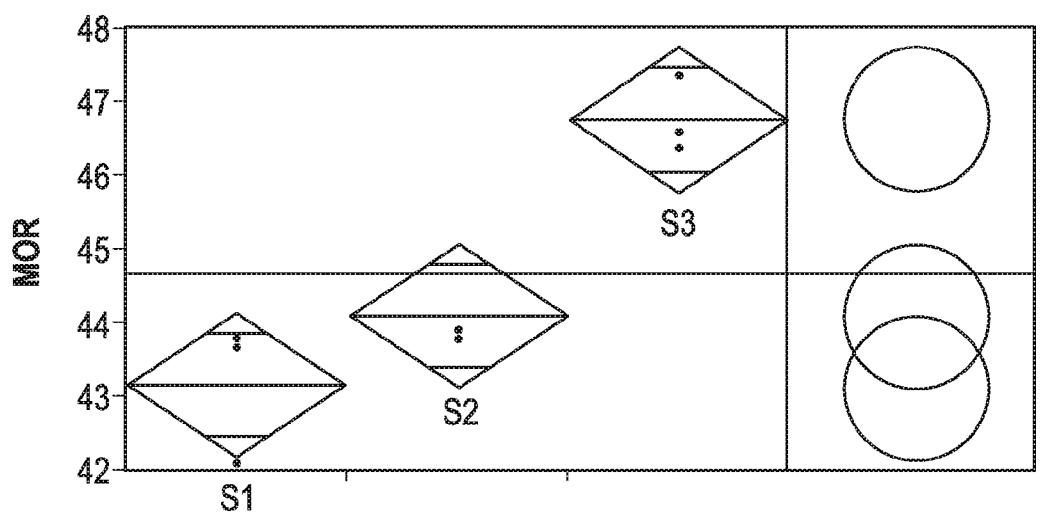
FIG. 7B includes a plot of modulus of elasticity of abrasive samples.

Samples of bonded abrasive articles including nanocrystalline alumina were formed. A mixture was created including abrasive particles including nanocrystalline alumina, bond material, and organic binders. The mixtures were then subjected to heat treatment at different temperatures to form the abrasive articles. Samples S1 and S2 were formed by heat treating the mixtures at 1260° C. Sample S3 was formed by heat treating the sample at 915° C. Properties including modulus of rupture and modulus of elasticity were tested on samples S1, S2, and S3. As illustrated in FIG. 7A, sample S3 demonstrated a significantly greater modulus of rupture as compared to samples S1 and S2. Further, sample S3 had significantly higher modulus of elasticity compared to samples S1 and S2, as illustrated in FIG. 7B.

Example 2

Two samples were obtained and tested for comparative purposes. A first sample (CS4) was a conventional vitrified bonded abrasive having microcrystalline alumina (MCA). The second sample (S5) was a vitrified bonded abrasive representative of embodiments herein. Sample CS4 included microcrystalline alumina having an average crystallite size of approximately 0.2 microns. Sample S5 included nanocrystalline alumina having an average crystallite size of approximately 0.1 microns. The average crystallite sizes for each of the samples were measured using the intercept method as described herein. Samples CS4 and S5 used the same vitreous bond as provided in Table 1 below. Further, samples CS4 and S5 had the same structure, including the same content of abrasive particles (approximately 40 vol % to 50 vol % for the total volume of the body), and the same content of bond materials (approximately 10 vol % to 15 vol %) and the same content of porosity (approximately 40-45 vol %), with the sum of all components equal to 100%. Samples CS4 and S5 were formed using the same process and both formed at approximately 915° C.

TABLE 1

| | |
|---|---|
| $SiO_2$ | 40-47 |
| $Al_2O_3$/Al | 25-31 |
| $Fe_2O_3$ | <1.0 |
| $TiO_2$ | <1.0 |
| CaO | 1-1.5 |
| MgO | <1.0 |
| $Na_2O$ | 5-10 |
| $K_2O$ | 0-5 |
| $B_2O_3$ | 10-17 |
| $Li_2O$ | 0-6 |

Figure 8:
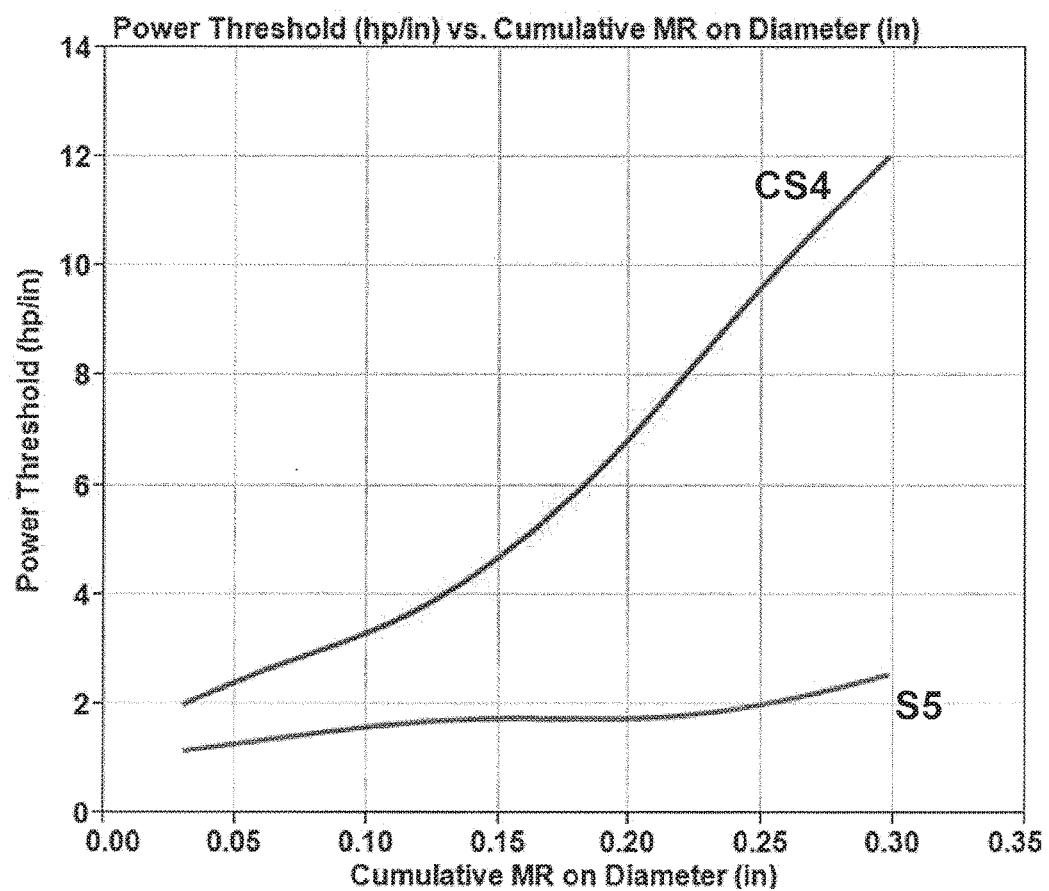
FIG. 8 includes a plot of power threshold of abrasive samples.

As illustrated in FIG. 8, sample S5 demonstrated steady low power threshold during an outside diameter grinding test as compared to sample CS4.

Example 3

Vickers hardness of representative MCA grain samples and NCA grain samples was measured in accordance with embodiments disclosed herein. The MCA grains and the NCA grains were obtained from Saint-Gobain Corporation. The MCA grains are available as Cerpass® HTB. The crystallite sizes of the nanocrystalline alumina and the microcrystalline alumina are about 0.1 microns and 0.2 microns, respectively. The samples of MCA grains and NCA grains were prepared in the same manner. Vickers hardness of 5 samples of MCA grains and NCA grains were tested. The average Vickers hardness of the MCA grains and the NCA grains is disclosed in Table 2.

The relative friability of the NCA grains was measured in accordance with the procedures disclosed herein. The MCA and NCA samples had grit size 80, and the MCA grains were used as the standard sample. The ball milling time was 6 minutes. As disclosed in Table 2, the relative friability of the MCA grains is set as 100%, and the NCA grains demonstrated Vickers hardness very similar to that of MCA grains, but had relative friability of 123%.

TABLE 2

| | MCA | NCA |
|---|---|---|
| Hardness (GPa) | 21.8 | 21.4 |
| Relative Friability | 100% | 123% |

The present embodiments represent a departure from the state of the art. While some patent publications have remarked that microcrystalline alumina can be made to have submicron average crystallite sizes, those of skill in the art recognize that commercially available forms of microcrystalline alumina have an average crystallite size of between approximately 0.18 to 0.25 microns. To the Applicants knowledge, alumina-based abrasives having finer average crystallite sizes have not been made commercially available. Furthermore, the results of the abrasive articles including NCA demonstrated remarkable and unexpected results, particularly in view of the discovery that Vickers hardness of MCA and NCA grains had essentially no distinction, and one of ordinary skill in the art might not expect a significant difference in the performance of a bonded abrasive utilizing the NCA grains. Moreover, one of ordinary skill in the art could have expected that the NCA grains may be less effective in vitreous bond materials, as the greater number of grains boundaries would make the abrasive grains even more susceptible to degradation. However, quite unexpectedly and remarkably, vitreous bonded abrasives made with the nanocrystalline alumina grains have demonstrated to be suitable for forming vitreous bonded abrasives, and in certain instances have proven to be equal or superior to vitreous bonded abrasives utilizing MCA.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article comprising:
   a body including:
      a bond material comprising an inorganic material comprising a ceramic; and
      abrasive particles contained within the bond material, the abrasive particles comprising nanocrystalline alumina having an average crystallite size of at least 0.01 microns and not greater than 0.16 microns,
   wherein the body comprises for a total volume of the body:
      40 vol % to 65 vol % of the abrasive particles;
      5 vol % to 20 vol % of the bond material; and
      15 vol % to 55 vol % of a porosity.

2. The abrasive article of claim 1, wherein the bond material comprises boron oxide.

3. The abrasive article of claim 1, wherein the abrasive particles comprise nanocrystalline alumina having an average crystallite size from at least about 0.05 microns to not greater than about 0.14 microns.

4. The abrasive article of claim 1, wherein the abrasive particles comprise nanocrystalline alumina having an average crystallite size from at least 0.07 microns to not greater than 0.13 microns.

5. The abrasive article of claim 1, wherein the abrasive particles comprising nanocrystalline alumina include at least about 51 wt % to not greater than about 99.9 wt % alumina for the total weight of the particles.

6. The abrasive article of claim 1, wherein the abrasive particles comprising nanocrystalline alumina include at least an additive comprising a material selected from the group consisting of magnesium, zirconium, calcium, silicon, iron, yttrium, lanthanum, cerium, and a combination thereof.

7. The abrasive article of claim 5, wherein the abrasive particles comprising nanocrystalline alumina include a total content of additive from at least 0.1 wt % to not greater than about 12 wt % for a total weight of the nanocrystalline alumina.

8. The abrasive article of claim 1, wherein the abrasive particles comprise a rare earth alumina crystallite.

9. The abrasive article of claim 1, wherein the abrasive particles comprise a spinel material.

10. The abrasive article of claim 1, wherein the bond material comprises a vitreous material having an amorphous phase.

11. The abrasive article of claim 1, wherein the body comprises a fixed abrasive article.

12. A method of forming an abrasive article comprising:
   forming a mixture including:
      a bond material comprising an inorganic material comprising a ceramic; and
      abrasive particles contained within the bond material, the abrasive particles comprising nanocrystalline alumina having an average crystallite size within a range of at least about 0.01 microns to not greater than 0.16 microns; and
      forming the mixture into an abrasive article by heating the mixture to a forming temperature of at least about 900° C. and not greater than about 1200° C.,
   wherein the abrasive article comprises a body comprising for a total volume of the body:
      40 vol % to 65 vol % of the abrasive particles;
      5 vol % to 20 vol % of the bond material; and
      15 vol % to 55 vol % of a porosity.

13. The method of claim 12, wherein the abrasive particles comprise nanocrystalline alumina having an average crystallite size within a range from at least about 0.05 microns to not greater than about 0.15 microns.

14. The method of claim 12, wherein the bond material comprises boron oxide.

15. The method of claim 12, wherein average crystallite size from at least about 0.05 microns to not greater than about 0.13 microns.

16. The method of claim 12, wherein the abrasive particles comprise a rare earth alumina crystallite.

17. The method of claim 12, wherein the abrasive particles comprise a spinel material.

18. The method of claim 12, wherein the abrasive particles comprising nanocrystalline alumina consist essentially of nanocrystalline alumina.

19. The method of claim 12, wherein the abrasive particles include a blend including a first type of abrasive particles including the nanocrystalline alumina and a second type of abrasive particles selected from the group consisting of oxides, carbides, nitrides, borides, oxycarbides, oxynitrides, superabrasives, carbon-based materials, agglomerates, aggregates, shaped abrasive particles, and a combination thereof.

* * * * *

(12) EX PARTE REEXAMINATION CERTIFICATE (12005th)
United States Patent
Sarangi et al.

(10) Number: US 9,982,175 C1
(45) Certificate Issued: Feb. 22, 2022

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Nilanjan Sarangi, Shrewsbury, MA (US); Yang Zhong, Hopkinton, MA (US); Sandhya Jayaraman Rukmani, Westborough, MA (US); Ralph Bauer, Niagara Falls, CA (US); Stafan Vujcic, Buffalo, NY (US)

(73) Assignees: SAINT-GOBAIN ABRASIVES, INC, Worcester, MA (US); SAINT-GOBAIN ABRASIFS, Conflans-Sainte-Honorine (FR)

Reexamination Request:
No. 90/014,805, Jul. 16, 2021

Reexamination Certificate for:
Patent No.: 9,982,175
Issued: May 29, 2018
Appl. No.: 14/984,291
Filed: Dec. 30, 2015

Related U.S. Application Data

(60) Provisional application No. 62/097,848, filed on Dec. 30, 2014.

(51) Int. Cl.
| | | |
|---|---|---|
| B24D 3/04 | (2006.01) | |
| B24D 3/14 | (2006.01) | |
| B24D 3/28 | (2006.01) | |
| B24D 3/34 | (2006.01) | |
| C09K 3/14 | (2006.01) | |

(52) U.S. Cl.
CPC ............. *C09K 3/1409* (2013.01); *B24D 3/28* (2013.01); *B24D 3/34* (2013.01); *C09K 3/1436* (2013.01)

(58) Field of Classification Search
None
See application file for complete search history.

(56) References Cited

To view the complete listing of prior art documents cited during the proceeding for Reexamination Control Number 90/014,805, please refer to the USPTO's public Patent Application Information Retrieval (PAIR) system under the Display References tab.

*Primary Examiner* — Ling X Xu

(57) ABSTRACT

An abrasive article can include a body including a bond material and abrasive particles contained within the bond material. The abrasive particles can include nanocrystalline alumina. The bond material can include an inorganic material including a ceramic.

ND OF DOC

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-4, 6-7, 12-15 and 17-19 are determined to be patentable as amended.

Claims 5, 8-11 and 16, dependent on an amended claim, are determined to be patentable.

New claim 20 is added and determined to be patentable.

1. An abrasive article comprising:
   a body including:
      a bond material comprising an inorganic material comprising a ceramic; and
      abrasive particles contained within the bond material, the abrasive particles comprising nanocrystalline alumina having an average crystallite size of at least [0.01] *0.09* microns and not greater than [0.16] *0.14* microns, *wherein the nanocrystalline alumina comprises an additive including:*
         $ZrO_2$ *of at least 2 wt % and not greater than 8 wt % for a total eight of the nanocrystalline alumina; and*
         *MgO of at least 0.1 wt % and not greater than 5 wt % for the total weight of the nanocrystalline alumina, wherein a weight content ration of MgO to $ZrO_2$ is at least 0.01 and not greater than 0.95,*
      wherein the body comprises for a total volume of the body:
         40 vol % to 65 vol % of the abrasive particles;
         5 vol % to 20 vol % of the bond material; and
         15 vol % to 55 vol % of a porosity.

2. The abrasive article of claim 1, wherein [the bond material comprises boron oxide] *the weight content ratio of MgO to $ZrO_2$ is at least 0.1 and not greater than 0.8*.

3. The abrasive article of claim [1] *2*, wherein the [abrasive particles comprise] nanocrystalline alumina [having an average crystallite size from at least about 0.05 microns to not greater than about 0.14 microns] *comprises at least 0.8 wt % of MgO for the total weight of the nanocrystalline alumina*.

4. The abrasive article of claim 1, wherein the [abrasive particles comprise] nanocrystalline alumina [having an] *has the* average crystallite size from at least [0.07] *0.09* microns to not greater than [0.13] *0.12* microns.

6. [The abrasive article of claim 1, wherein the abrasive particles comprising nanocrystalline alumina include at least an additive comprising a material selected from the group consisting of magnesium, zirconium, calcium, silicon, iron, yttrium, lanthanum, cerium, and a combination thereof] *An abrasive article comprising:*
   *a body including:*
      *a bond material comprising a vitreous material comprising for a total weight of the bond material;*
         $SiO_2$ *of at least 3 wt % and not greater than 65 wt %,*
         $B_2O_3$ *of at least 10 wt % and not greater than 22 wt %,*
         $Al_2O_3$ *of at least 8 wt % and not greater than 32 wt %, and*
         *a total content of $Al_2O_3$ and Al of at least 15 wt % and not greater than 38 wt %; and*
      *abrasive particles contained within the bond material, the abrasive particles comprising nanocrystalline alumina having an average crystallite size of at least 0.09 microns and not greater than 0.13 microns, wherein the nanocrystalline alumina comprises an additive including:*
         $ZrO_2$ *of at least 2 wt % and not greater than 8 wt % for a total weight of the nanocrystalline alumina; and*
         *MgO of at least 0.1 wt % and not greater than 5 wt % for the total weight of the nanocrystalline alumina, wherein a weight content ratio of MgO to $ZrO_2$ is at least 0.05 and not greater than 0.95,*
   *wherein the body comprises for a total volume of the body;*
      *40 vol % to 65 vol % of the abrasive particles;*
      *5 vol % to 20 vol % of the bond material; and*
      *15 vol % to 55 vol % of a porosity.*

7. The abrasive article of claim [5] *1*, wherein the [abrasive particles comprising] nanocrystalline alumina include a total content of *the* additive [from at least 0.1 wt % to] *of* not greater than about 12 wt % for [a] *the* total weight of the nanocrystalline alumina.

12. A method of forming an abrasive article comprising:
    forming a mixture including:
       a bond material comprising an inorganic material comprising a ceramic; and
       abrasive particles contained within the bond material, the abrasive particles comprising nanocrystalline alumina having an average crystallite size within a range of at least about [0.01] *0.09* microns to not greater than [0.16] *0.14* microns, *wherein the nanocrystalline alumina comprises an additive including:*
          $Zr_O$ *of at least 2 wt % and not greater than 8 wt % for a total weight of the nanocrystalline alumina; and*
          *MgO of 0.1 wt % and not greater than 5 wt % for the total weight of the nanocrystalline alumina, wherein a weight content ratio of MgO to $ZrO_2$ is at least 0.01 and not greater than 0.95;* and
    forming the mixture into an abrasive article by heating the mixture to a forming temperature of at least about 900° C. and not greater than about 1200° C.,
    wherein the abrasive article comprises a body comprising for a total volume of the body:
       40 vol % to 65 vol % of the abrasive particles;
       5 vol % to 20 vol % of the bond material; and
       15 vol % to 55 vol % of a porosity.

13. The method of claim 12, wherein the abrasive particles comprise nanocrystalline alumina having an average crystallite size [within a range from at least about 0.05 microns to] *of* not greater than about [0.15] *0.12* microns.

14. The method of claim 12, wherein the [bond material comprises boron oxide] *weight content ratio of MgO to $ZrO_2$ is at least 0.1 and not greater than 0.8*.

15. The method of claim [12] *14*, wherein [average crystallite size from at least about 0.05 to not greater than about 0.13 microns] *the nanocrystalline alumina comprises at least 0.8 wt % of MgO for the total weight of the nanocrystalline alumina*.

17. The [method] *abrasive article* of claim [12] *6*, wherein [the abrasive particles comprise a spinel material] *the weight content ratio of MgO to ZrO₂ is at least 0.1 and not greater than 0.8*.

18. The [method] *abrasive article* of claim [12] *17*, wherein the [abrasive particles comprising nanocrystalline alumina consist essentially of nanocrystalline alumina] *nanocrystalline alumina comprises at least 0.8 wt % of MgO for the total weight of the nanocrystalline alumina*.

19. The [method] *abrasive article* of claim [12] *6*, wherein the [abrasive particles include a blend including a first type of abrasive particles including the nanocrystalline alumina and a second type of abrasive particles selected from the group consisting of oxides, carbides, nitrides, borides, oxycarbides, oxynitrides, superabrasives, carbon-based materials, agglomerates, aggregates, shaped abrasive particles, and a combination thereof] *nanocrystalline alumina has a density of at least 3.94 g/cc and at most 4.12 g/cc*.

20. *The abrasive article of claim 1, wherein the nanocrystalline alumina has a density of at least 3.94 g/cc and at most 4.12 g/cc.*

\* \* \* \* \*